United States Patent
Imai

(10) Patent No.: US 8,015,399 B2
(45) Date of Patent: *Sep. 6, 2011

(54) COMMUNICATION APPARATUS, COMMUNICATION SYSTEM, CERTIFICATE TRANSMISSION METHOD AND PROGRAM

(75) Inventor: Tatsuya Imai, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 1105 days.

This patent is subject to a terminal disclaimer.

(21) Appl. No.: 10/951,654

(22) Filed: Sep. 29, 2004

(65) Prior Publication Data

US 2005/0102503 A1    May 12, 2005

(30) Foreign Application Priority Data

Sep. 30, 2003  (JP) ................................. 2003-341329
Jul. 26, 2004   (JP) ................................. 2004-217713

(51) Int. Cl.
*H04L 9/00* (2006.01)

(52) U.S. Cl. ........ 713/156; 713/158; 713/176; 713/177; 713/178; 380/258

(58) Field of Classification Search .................... 713/158
See application file for complete search history.

(56) References Cited

U.S. PATENT DOCUMENTS

| | | | |
|---|---|---|---|
| 5,659,617 A * | 8/1997 | Fischer | 380/258 |
| 5,781,723 A | 7/1998 | Yee et al. | |
| 6,314,521 B1 | 11/2001 | Debry | |
| 6,367,013 B1 * | 4/2002 | Bisbee et al. | 713/178 |
| 6,615,347 B1 | 9/2003 | De Silva et al. | |
| 6,763,459 B1 | 7/2004 | Corella | |
| 6,816,900 B1 * | 11/2004 | Vogel et al. | 709/225 |
| 6,854,057 B2 * | 2/2005 | Roskind et al. | 713/156 |
| 6,981,139 B2 * | 12/2005 | Enokida | 713/156 |
| 7,340,600 B1 * | 3/2008 | Corella | 713/155 |
| 7,451,307 B2 * | 11/2008 | Matsushima | 713/156 |
| 2001/0036297 A1 | 11/2001 | Ikegami et al. | |
| 2002/0078346 A1 * | 6/2002 | Sandhu et al. | 713/156 |
| 2002/0099663 A1 | 7/2002 | Yoshino et al. | |
| 2002/0152382 A1 * | 10/2002 | Xiao | 713/173 |
| 2003/0051134 A1 * | 3/2003 | Gupta | 713/156 |
| 2003/0135732 A1 * | 7/2003 | Vaha-Sipila | 713/156 |
| 2003/0172308 A1 | 9/2003 | Imai | |

(Continued)

FOREIGN PATENT DOCUMENTS

EP    1 117 204 A2    7/2001

(Continued)

OTHER PUBLICATIONS

Paul Ashley, et al., "Wired versus Wireless Security: The Internet, WAP and iMode for E-Commerce", Proceedings of 17th annual Computer Security Applications Conference (ACSAC 2001), 2001, pp. 296-306.

(Continued)

*Primary Examiner* — Kambiz Zand
*Assistant Examiner* — Yonas Bayou
(74) *Attorney, Agent, or Firm* — Oblon, Spivak, McClelland, Maier & Neustadt, L.L.P.

(57) ABSTRACT

A communication apparatus includes an authentication part for authenticating another communication apparatus with a first digital certificate, and a certificate transmission part for transmitting a second digital certificate when the authentication part succeeds in authenticating the other communication apparatus with the first digital certificate.

36 Claims, 23 Drawing Sheets

U.S. PATENT DOCUMENTS

| | | | |
|---|---|---|---|
| 2003/0223766 A1 | 12/2003 | Imai | |
| 2004/0255113 A1* | 12/2004 | Ogura | 713/156 |
| 2005/0033957 A1* | 2/2005 | Enokida | 713/156 |
| 2005/0191990 A1* | 9/2005 | Willey et al. | 455/411 |
| 2006/0036850 A1* | 2/2006 | Enokida | 713/156 |

FOREIGN PATENT DOCUMENTS

| | | |
|---|---|---|
| EP | 1 271 875 A1 | 1/2003 |
| GB | 2 359 969 | 9/2001 |
| JP | 5-336108 | 12/1993 |
| JP | 9-200194 | 7/1997 |
| JP | 11-174956 | 7/1999 |
| JP | 2001-94553 | 4/2001 |
| JP | 2001-229078 | 8/2001 |
| JP | 2001-237820 | 8/2001 |
| JP | 2001-249612 | 9/2001 |
| JP | 2001-307102 | 11/2001 |
| JP | 2001-326632 | 11/2001 |
| JP | 2002-247032 | 8/2002 |
| JP | 2002-251492 | 9/2002 |
| JP | 2002-529008 | 9/2002 |
| JP | 2002-287629 | 10/2002 |
| JP | 2002-353959 | 12/2002 |
| JP | 2003-16031 | 1/2003 |
| JP | 2003-503963 | 1/2003 |
| WO | WO 99/35783 | 7/1999 |
| WO | WO 00/79724 A2 | 12/2000 |

OTHER PUBLICATIONS

Larry J. Hughes / translated by Hiroharu Nagahara "Internet Security" Published by Impress, Inc., Feb. 21, 1997, pp. 86-108, Corresponding to Larry J. Hughes, "Actually useful Internet security techniques", Published by New Riders, Oct. 1995, pp. 83-103.

U.S. Appl. No. 10/667,306, filed Sep. 23, 2003, Tatsuya Imai.

* cited by examiner

FIG.4

|  | OBTAIN STATUS | OBTAIN LOG | UPDATE CERTIFICATE | EXECUTE COMMAND |
|---|---|---|---|---|
| RESCUE PUBLIC KEY CERTIFICATE | × | × | ○ | × |
| REGULAR PUBLIC KEY CERTIFICATE | ○ | ○ | ○ | ○ |

FIG.8

```
Data:
    Version: 3 (0x2)
    Serial Number: 0 (0x0)
    Signature Algorithm: md5WithRSAEncription
A ─ Issuer: C=JP, ST=Tokyo, L=Ohtaku, O=XXX Company, Ltd, CN=CA001
    Validity
B ─{   Not Before: May 20 00:00:00 2000 GMT
       Not After : May 20 00:00:00 2001 GMT
C ─ Subject: C=JP, Tokyo, L=Ohtaku, O=XXX Company, Ltd, CN=Device-0123456
    Subject Public Key Info:
        Public Key Algorithm: rsaEncription
        RSA Public Key: (1024 bit)
            Modulus (1024 bit):
                Device-Public Key of 0123456

Exponent: 65537 (0x10001)
Signature Algorithm: md5WithRSAEncription
Signature:
            CA Signature Data of CA001
```

FIG.9

Data:
  Version: 3 (0x2)
  Serial Number: 0 (0x0)
  Signature Algorithm: md5WithRSAEncription
D ⌒ Issuer: C=JP, ST=Tokyo, L=Ohtaku, O=XXX Company, Ltd, CN=RegularCA
  ⌒ Validity
E     Not Before: Jan 1 00:00:00 2003 GMT
     Not After : Jan 1 00:00:00 2004 GMT
F ⌒ Subject: C=JP, Tokyo, L=Ohtaku, O=XXX Company, Ltd, CN=Device-0123456
  Subject Public Key Info:
    Public Key Algorithm: rsaEncription
    RSA Public Key: (1024 bit)
    Modulus (1024 bit):
       [Device-Public Key of 0123456]

Exponent: 65537 (0x10001)
Signature Algorithm: md5WithRSAEncription
Signature:
    [CA Signature Data of Regular CA]

FIG.10

```
Data:
    Version: 3 (0x2)
    Serial Number: 0 (0x0)
    Signature Algorithm: md5WithRSAEncription
G ─ Issuer: C=JP, ST=Tokyo, L=Ohtaku, O=XXX Company, Ltd, CN=RescueCA
    Validity
H ⎰  Not Before: Jan 1 00:00:00 2000 GMT
  ⎱  Not After : Jan 1 00:00:00 2050 GMT
I ─ Subject: C=JP, Tokyo, L=Ohtaku, O=XXX Company, Ltd, CN=Device-0123456
    Subject Public Key Info:
        Public Key Algorithm: rsaEncryption
        RSA Public Key: (1024 bit)
            Modulus (1024 bit):
                Device-Public Key of 0123456

Exponent: 65537 (0x10001)
Signature Algorithm: md5WithRSAEncription
Signature:
            CA Signature Data of Rescue CA
```

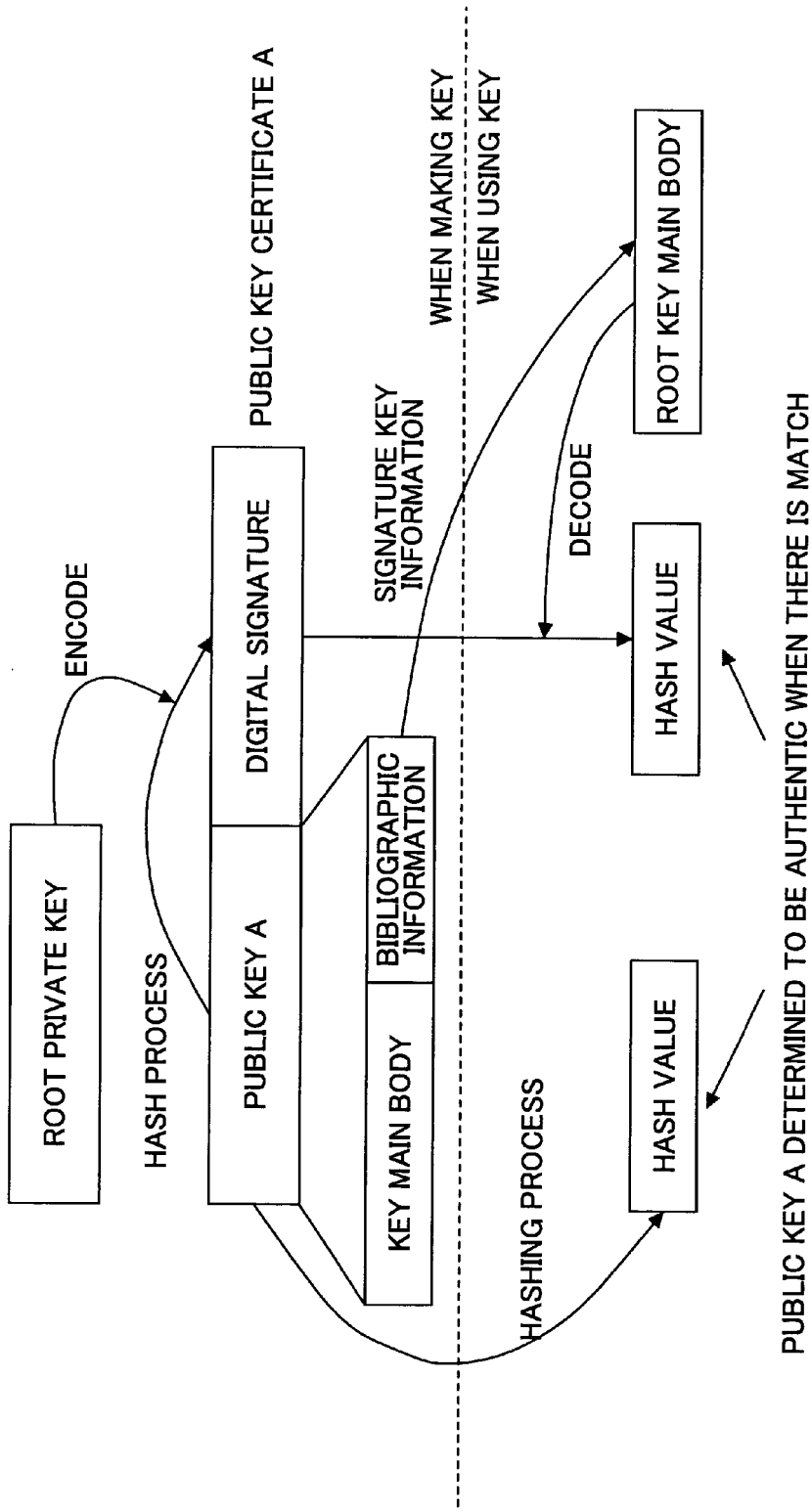

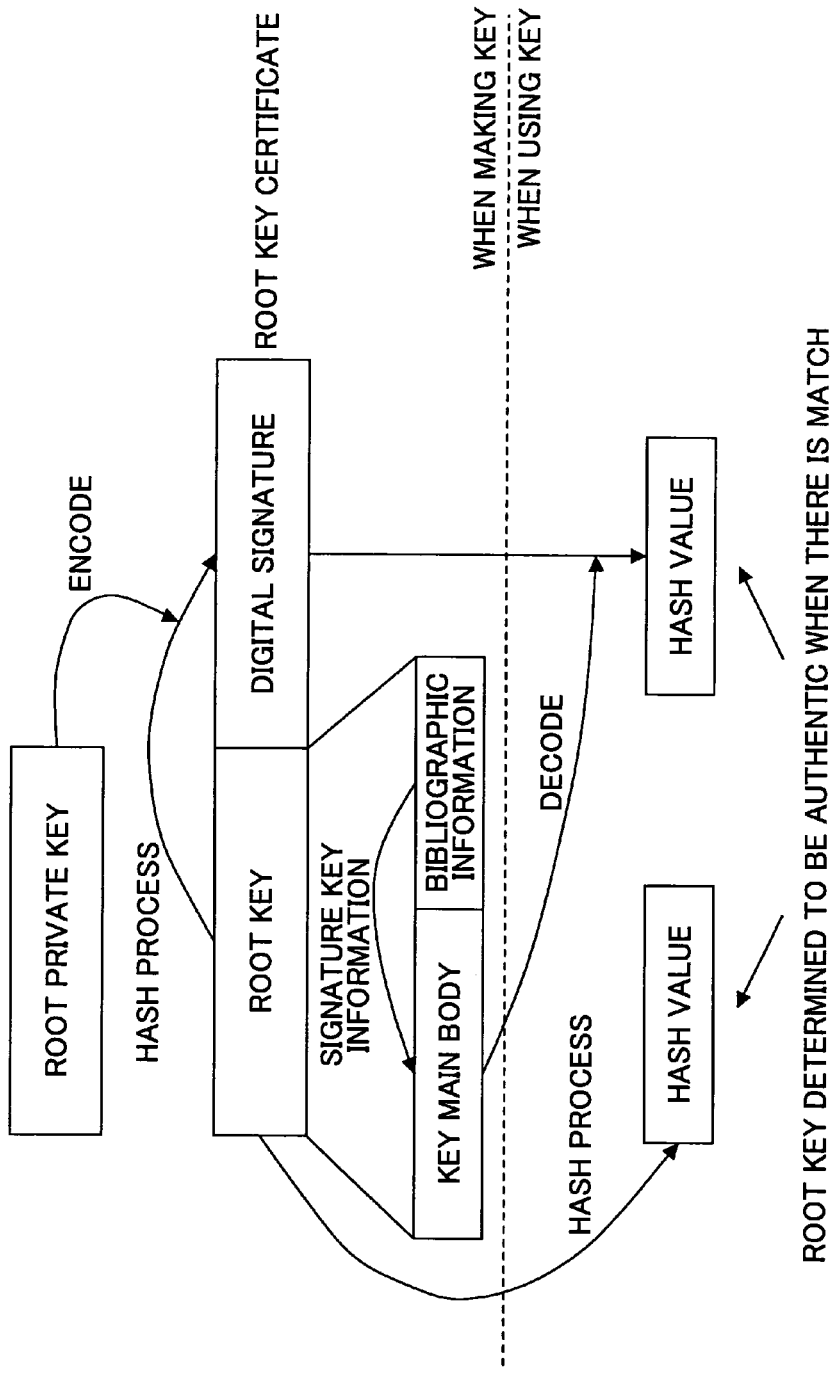

COMMUNICATION APPARATUS, COMMUNICATION SYSTEM, CERTIFICATE TRANSMISSION METHOD AND PROGRAM

BACKGROUND OF THE INVENTION

1. Field of the Invention

The present invention relates to a communication apparatus for authenticating another communication apparatus by using a digital certificate, a communication system having the communication apparatus serving as an upper level apparatus and the other communication apparatus serving as a lower level apparatus, a certificate transmission method for transmitting a digital certificate to be used in authentication with the communication apparatuses and the communication system, and a program for enabling a computer to function as the communication apparatus.

2. Description of the Related Art

In the past recent years and continuing, various systems, having numerous communication apparatuses communicating through a network, are being constructed. One example is the so-called e-commerce system which employs a communication server apparatus for receiving orders through the Internet. In another exemplary system, various electronic apparatuses serving as a client apparatus or a server apparatus are connected via a network for enabling remote management of the electronic apparatuses by communicating with each other.

Confirming whether the communication opponent is authentic and/or whether the transmitted information has been tampered with is necessary in constructing such systems. Particularly, in a case of transmitting confidential information through the Internet where information is liable to be transferred to an unauthorized opponent, it is also necessary to prevent others from viewing (stealing) the content of the confidential information. As one example, SSL (Secure Socket Layer) is a well-known communication protocol that is developed for satisfying the above-described necessities. This protocol authenticates the communication opponent by using a combination of a public key encryption method and a private key encryption method, and prevents tampering or interception by encrypting confidential information. In addition, this protocol not only enables authentication of the communication opponent, but also the communication origin.

Methods (technologies) using the SSL protocol and public key encryption are shown, for example, in Japanese Laid-Open Patent Application Nos. 2002-353959 and 2002-251492.

Next, a communication procedure for performing a two-way authentication using SSL is described by focusing particularly on an authentication process part. FIG. 22 is a flowchart showing processes executed by respective apparatuses in a two-way authentication using SSL, and information used in the processes.

As shown in FIG. 22, both communication apparatuses A and B employed in the two-way authentication using SSL are to be provided with a root key certificate, a private key (A,B), and a public key certificate (A,B), respectively. The private keys A, B are private keys issued to each of the communication apparatuses A, B by a certificate authority (CA). The public key certificates A, B are digital certificates provided by the CA, in which the CA attaches digital signatures to the public keys A, B corresponding to the private keys A, B, respectively. The root key certificates are digital certificates provided by the CA, in which the CA attaches digital signatures to the root keys corresponding to respective root private keys. This relation is described with reference to FIGS. 23A and 23B.

In FIG. 23A, the public key A is formed of a public key main body for decoding encoded documents using the private key A, and bibliographic information including, for example, information of the issuer of the public key A (CA) or the validity term of the public key A. In order to show that neither the public key main body nor the bibliographic information of the public key A has been tampered with, the CA performs a hash process on the public key A, and encodes the obtained hash value by using the root private key, to thereby obtain a public key certificate A having the public key A attached with a digital signature. In attaching the digital signature to the public key A, identification information of the root private key used for the digital signature is added as signature key information to the bibliographic information of the public key A.

In verifying authenticity of the public key certificate A, the digital signature included in the public key certificate A is decoded with a key main body of the root key which is a public key corresponding to the root private key. If the decoding succeeds, it is determined that the digital signature is indeed attached by the CA. If the hash value obtained by decoding with the root key main body matches with the above-described hash value obtained by hash processing the public key A, it is determined that the public key has neither been damaged nor tampered with. If it is possible to successfully decode received data with the public key A, it is determined that the data is transmitted from the holder of the private key A.

In performing the verification, it is necessary to store the root key beforehand. As shown in FIG. 23B, the root key certificate includes the root key attached with a digital signature from the CA. The root key certificate is a self signature type which allows the digital signature to be decoded with the public key included therein. In using the root key, the digital signature is decoded with the root key main body included in the root key certificate, to thereby compare the hash value obtained by decoding with the root key, and the hash value obtained by hash processing the root key. If the hash values match, it is determined that the root key has neither been damaged nor tampered with.

Next, FIG. 22 is described. In FIG. 22, the arrows are illustrated for indicating data transfer, in which a sender transmits data during a step that is indicated proximate to the arrow stem, and a receiver executes a step indicated proximate to the arrow head upon receiving the data. The moment any one of the steps ends in failure, a response reporting the failure is transmitted, and the authentication process is discontinued. The same applies in a case when receiving the response reporting failure, or when a timeout of a process occurs.

In the example shown in FIG. 22, a communication apparatus A requests communication (connection) to a communication apparatus B. In conducting the request, a CPU of the communication apparatus A executes a prescribed control program, and starts the process shown in the left side of the flowchart shown in FIG. 22. Then, in Step S11, the communication apparatus A transmits a connection request to the communication apparatus B.

Meanwhile, when the communication apparatus B receives the connection request, a CPU of the communication apparatus B executes a prescribed control program, and starts the process shown in the right side of the flowchart shown in FIG. 22. Then, in Step S21, the communication apparatus B generates a first random number(s) and encodes the first random number with a private key B. In Step S22, the encoded first random number and the above-described public key certificate B are transmitted to the communication apparatus A.

In Step S12, when the communication apparatus A receives the encoded first random number and the public key certificate B, the communication apparatus A determines the authenticity of the public key certificate B by using the root key certificate.

In Step S13, when the communication apparatus A determines that the public key certificate B is authentic, the communication apparatus A decodes the encoded first random number by using the public key B included in the public key certificate B. If the decoding is successful, it is determined that the first random number is indeed originating from the issue target of the public key certificate B.

In Step S14, aside from the above, the communication apparatus A generates a second random number(s) and a common key seed. The common key seed can be generated, for example, by using data handled in previous communications. In Step S15, the second random number is encoded by using the private key A, and encoding the common key seed by using the public key B. In Step S16, the encoded second random number and the encoded common key seed are transmitted to the communication apparatus B. The encoding of the common key seed prevents an apparatus of a person other than the communication opponent from accessing the common key seed.

In Step S17, a common key is generated from the common key seed generated in Step S14, after which the common key is to be used in encoding communication from thenceforth.

In Step S23, when the communication apparatus B receives the data transmitted in Step S16, the communication apparatus B determines the authenticity of the public key certificate A by using the root key certificate. In Step S24, when it is determined that the public key certificate A is authentic, the communication apparatus B decodes the second random number by using the public key A included in the public key certificate A. If the decoding is successful, it is determined that the second random number is indeed originating from the issue target of the public key certificate B.

Then, in Step S25, the communication apparatus B decodes the common key seed by using the private key B. Accordingly, the communication apparatus A and the communication apparatus B share the same common key seed. Thus, no apparatus other than the communication apparatuses A and B has access (knowledge) of the common key seed. In Step S26, when the foregoing steps are successfully completed, the communication apparatus B generates a common key, which is to be used in encoding communication from thenceforth, from the common key seed.

Subsequent to Step S17 of communication apparatus A and Step S26 of communication B, the communication apparatuses A and B confirm with each the success of the authentication process and the encoding method that is to be used in communication thenceforth. Then, the authentication process is finished. The confirmation step includes a response informing success of the authentication from the communication apparatus B. Hereafter, communication between the communication apparatus A and the communication apparatus B is established, wherein the communication is performed by encoding data with a common key encoding method.

With this authentication process, the communication apparatuses A, B can securely share a common key after verifying each other's authenticity, and thereby establish a secure communication route.

In the above-described authentication process, however, the step of encoding the second random number by using the public key A (Step S15 in FIG. 22) and the step of transmitting the public key certificate A (Step S16 in FIG. 22) are not requisites. In this case, the communication apparatus B does not perform the Steps S23 and S24 shown in FIG. 22, but alternatively performs a process shown in FIG. 24. Here, although the communication apparatus B is unable to verify authenticity of the communication apparatus A, this is sufficient in a case where only the communication apparatus A needs to verify the communication apparatus B. In this case, only the root key certificate is required to be stored in the communication apparatus A, and neither the private key A nor the public key certificate A are required to be stored therein. The root key certificate is not required to be stored in the communication apparatus B.

In the above-described authentication processes, data encoded with a public key can only be decoded with a private key corresponding to the public key, and data encoded with a private key can only be decoded with a public key corresponding to the private key. Accordingly, one can determine that its communication opponent is the apparatus indicated as the issue target in the public key certificate (or the user of the apparatus indicated as the issue target in the public key certificate).

Under the premise that the secrecy of the route private key of the CA is ensured, one can determine that the public key certificate has been authenticated by the CA, and that the CA has ensured the correctness of content of the public key certificate. However, there is no way other than trusting the authentication of the CA in terms of whether the communication opponent is indeed the one indicated in the public key certificate. Therefore, credibility of the CA is an important factor for ensuring security in communication by using public key authentication.

Meanwhile, companies such as VeriSign Inc. or Baltimore Technologies serve as third-party organizations providing a commercial service of verifying owners of private keys, providing digital signatures to public keys corresponding to the private keys, and issuing public key certificates. Public key certificates that are widely used are those issued by highly trusted third-party organizations having a public key issuing system that strictly controls private keys and the like. Furthermore, in authentication using digital certificates, there is a demand to use public key certificates that are issued by the highly trusted third-party organizations.

In addition, route keys used in determining the content of digital signatures from highly trusted third-party organizations are often installed in a commonly used Web browser (e.g. Internet Explorer (Registered Trademark), Netscape (Registered Trademark)) beforehand. Therefore, the user of such a Web browser acquires a benefit of not having to obtain a new route key or set the obtained route key.

Even if the route key is not pre-installed in the user's terminal apparatus, it is more likely that the user would agree in setting the route key if the route key is that of a highly trusted third-person organization. Furthermore, by obtaining the route key, apparatuses having a public key certificate issued by the same third-party organization can perform authentication regardless of the manufacturer or vendor of the apparatus. Therefore, use of a public key certificate issued by a third-party organization is effective in connecting to an apparatus of a different manufacturer, and is in large demand not only by manufacturers of the communication apparatuses but also the users of the communication apparatuses.

In order to improve credibility of the public key certificates, the third-party organizations set a validity term to its issued public key certificates. Although the public key certificates are typically set with a term of several years, some public key certificates are set with a short term ranging from 1 to 3 years. In an authentication process, a public key certificate having an expired validity term is considered as an invalid public key certificate.

Expiration of the validity of the public key certificate may not be a significant problem in a case where a user can easily renew the validity term of the public key certificate by using another apparatus (e.g. personal computer). However, dealing with the expiration of the validity term of a public key certificate could become an obstacle, for example, in a case where renewal is difficult due to skill or environment of the user, or a case where it is inappropriate to allow the user to freely renew (set) the public key certificate.

More specifically, for example, in a case where the validity term expires due to an apparatus being switched off during the expiration of the validity term, the public key certificate can no longer be used in authentication, thereby raising a problem in that a new public key certificate cannot be reliably nor easily obtained. This problem may also occur in a case of an apparatus having a preinstalled public key certificate, in which the apparatus remains unshipped in a warehouse until the expiration of the validity term.

This problem could occur even in a case where a vendor or manufacturer issues a public key certificate to an apparatus, especially when a validity term is shortened for security purposes, and could occur in a case where a digital certificate other than the public key certificate is used.

SUMMARY OF THE INVENTION

It is a general object of the present invention to provide a communication apparatus, a communication system, a certificate transmission method, and a program that substantially obviate one or more of the problems caused by the limitations and/or disadvantages of the related art.

Features and advantages of the present invention will be set forth in the description which follows, and in part will become apparent from the description and the accompanying drawings, or may be learned by practice of the invention according to the teachings provided in the description. Objects as well as other features and advantages of the present invention will be realized and attained by a communication apparatus, a communication system, a certificate transmission method, and a program particularly pointed out in the specification in such full, clear, concise, and exact terms as to enable a person having ordinary skill in the art to practice the invention.

To achieve these and other advantages and in accordance with the purpose of the invention, as embodied and broadly described herein, the invention provides a communication apparatus including: an authentication part for authenticating another communication apparatus with a first digital certificate; and a certificate transmission part for transmitting a second digital certificate when the authentication part succeeds in authenticating the other communication apparatus with the first digital certificate.

In the communication apparatus according to an embodiment of the present invention, the authentication part may authenticate the other communication apparatus with the first digital certificate when the authentication part fails in authenticating the other communication apparatus with the second digital certificate.

In the communication apparatus according to an embodiment of the present invention, the first digital certificate may have a validity term which is longer than a validity term of the second digital certificate.

In the communication apparatus according to an embodiment of the present invention, the first digital certificate may have a validity term which is longer than a life-span of the other communication apparatus, and the second digital certificate may have a validity term which is shorter than the life-span of the other communication apparatus.

In the communication apparatus according to an embodiment of the present invention, the first digital certificate may have a validity term which does not expire when the other communication apparatus is in operation, and the second digital certificate may have a validity term which expires when the other communication apparatus is in operation.

In the communication apparatus according to an embodiment of the present invention, the first digital certificate may have substantially no validity term, and the second digital certificate may have a validity term.

In the communication apparatus according to an embodiment of the present invention, the authentication part may authenticate the other communication apparatus in accordance with at least one of SSL protocol and TLS protocol.

In the communication apparatus according to an embodiment of the present invention, the second digital certificate may be a public key certificate of the other communication apparatus.

Furthermore, the present invention provides a communication apparatus including: a certificate memory part for storing a first digital certificate and a second digital certificate; and a certificate update part for updating the second digital certificate stored in the certificate memory part when receiving a new second digital certificate from another communication apparatus.

Furthermore, the present invention provides a communication system including: a first communication apparatus, the first communication apparatus including a certificate memory part for storing a first digital certificate and a second digital certificate; and a second communication apparatus, the second communication apparatus including an authentication part for authenticating the first communication apparatus with the first digital certificate, and a certificate transmission part for transmitting a new second digital certificate when the authentication part succeeds in authenticating the first communication apparatus with the first digital certificate.

In the communication system according to an embodiment of the present invention, the authentication part may authenticate the first communication apparatus with the first digital certificate when the authentication part fails in authenticating the first communication apparatus with the second digital certificate.

In the communication system according to an embodiment of the present invention, the first digital certificate may be used for authenticating the first communication apparatus in a case of storing the new second digital certificate in the first communication apparatus.

In the communication system according to an embodiment of the present invention, the first digital certificate may have a validity term which is longer than a validity term of the second digital certificate.

In the communication system according to an embodiment of the present invention, the first digital certificate may have a validity term which is longer than a life-span of the first communication apparatus, and the second digital certificate may have a validity term which is shorter than the life-span of the first communication apparatus.

In the communication system according to an embodiment of the present invention, the first digital certificate may have a validity term which does not expire when the first apparatus is in operation, and the second digital certificate may have a validity term which expires when the first communication apparatus is in operation.

In the communication system according to an embodiment of the present invention, the first digital certificate may have substantially no validity term, and the second digital certificate may have a validity term.

In the communication system according to an embodiment of the present invention, the communication system may further include another first communication apparatus, the other first communication apparatus including another certificate memory part for storing at least one of the first digital certificate and the second digital certificate.

In the communication system according to an embodiment of the present invention, the authentication part authenticates the first communication apparatus in accordance with at least one of SSL protocol and TLS protocol.

In the communication system according to an embodiment of the present invention, the second digital certificate is a public key certificate of the first communication apparatus.

Furthermore, the present invention provides a certificate transmission method including the steps of: a) authenticating another communication apparatus with a first digital certificate; and b) transmitting a second digital certificate when the authentication of the other communication apparatus with the first digital certificate in step a) succeeds.

In the certificate transmission method according to an embodiment of the present invention, the other communication apparatus may be authenticated with the first digital certificate in step a) when a step of authenticating the other communication apparatus with the second digital certificate fails.

In the certificate transmission method according to an embodiment of the present invention, the first digital certificate may have a validity term which is longer than a validity term of the second digital certificate.

In the certificate transmission method according to an embodiment of the present invention, the first digital certificate may have a validity term which is longer than a life-span of the other communication apparatus, and the second digital certificate may have a validity term which is shorter than the life-span of the other communication apparatus.

In the certificate transmission method according to an embodiment of the present invention, the first digital certificate may have a validity term which does not expire when the other communication apparatus is in operation, and the second digital certificate may have a validity term which expires when the other communication apparatus is in operation.

In the certificate transmission method according to an embodiment of the present invention, the first digital certificate may have substantially no validity term, and the second digital certificate may have a validity term.

In the certificate transmission method according to an embodiment of the present invention, the other communication apparatus may be authenticated in step a) in accordance with at least one of SSL protocol and TLS protocol.

In the certificate transmission method according to an embodiment of the present invention, the second digital certificate may be a public key certificate of the other communication apparatus.

Furthermore, the present invention provides another certificate transmission method including the steps of: a) storing a first digital certificate and a second digital certificate in a first communication apparatus; b) authenticating the first communication apparatus with the first digital certificate; and c) transmitting a new second digital certificate when the authentication of the first communication apparatus with the first digital certificate in step b) succeeds.

In the other certificate transmission method according to an embodiment of the present invention, the first communication apparatus may be authenticated with the first digital certificate in step b) when a step of authenticating the first communication apparatus with the second digital certificate fails.

In the other certificate transmission method according to an embodiment of the present invention, the first digital certificate may be used for authenticating the first communication apparatus in a case of storing the new second digital certificate in the first communication apparatus.

In the other certificate transmission method according to an embodiment of the present invention, the first digital certificate may have a validity term which is longer than a validity term of the second digital certificate.

In the other certificate transmission method according to an embodiment of the present invention, the first digital certificate may have a validity term which is longer than a life-span of the first communication apparatus, and the second digital certificate may have a validity term which is shorter than the life-span of the first communication apparatus.

In the other certificate transmission method according to an embodiment of the present invention, the first digital certificate may have a validity term which does not expire when the first communication apparatus is in operation, and the second digital certificate may have a validity term which expires when the first communication apparatus is in operation.

In the other certificate transmission method according to an embodiment of the present invention, the first digital certificate may have substantially no validity term, and the second digital certificate may have a validity term.

In the other certificate transmission method according to an embodiment of the present invention, the other certificate transmission method may further include a step of storing at least one of the first digital certificate and the second digital certificate in another first communication apparatus.

In the other certificate transmission method according to an embodiment of the present invention, the first communication apparatus may be authenticated in step b) in accordance with at least one of SSL protocol and TLS protocol.

In the other certificate transmission method according to an embodiment of the present invention, the second digital certificate may be a public key certificate of the first communication apparatus.

Furthermore, the present invention provides a program to be installed or executed by a computer of a communication apparatus, the program including: a) an authenticating function for authenticating another communication apparatus with a first digital certificate; and b) a transmitting function for transmitting a second digital certificate when the authentication of the other communication apparatus with the first digital certificate in function a) succeeds.

In the program according to an embodiment of the present invention, the other communication apparatus may be authenticated with the first digital certificate in function a) when a function of authenticating the other communication apparatus with the second digital certificate fails.

In the program according to an embodiment of the present invention, the first digital certificate may have a validity term which is longer than a validity term of the second digital certificate.

In the program according to an embodiment of the present invention, the first digital certificate may have a validity term which is longer than a life-span of the other communication apparatus, and the second digital certificate may have a validity term which is shorter than the life-span of the other communication apparatus.

In the program according to an embodiment of the present invention, the first digital certificate may have a validity term which does not expire when the other communication apparatus is in operation, and the second digital certificate may have a validity term which expires when the other communication apparatus is in operation.

In the program according to an embodiment of the present invention, the first digital certificate may have substantially no validity term, and the second digital certificate may have a validity term.

In the program according to an embodiment of the present invention, the other communication apparatus may be authenticated in function a) in accordance with at least one of SSL protocol and TLS protocol.

In the program according to an embodiment of the present invention, the second digital certificate may be a public key certificate of the other communication apparatus.

Furthermore, the present invention provides another program to be installed or executed by a computer of a communication apparatus, the other program including: a) a storing function for storing a first digital certificate and a second digital certificate; and b) an updating function for updating the second digital certificate when receiving a new second digital certificate from another communication apparatus.

Other objects and further features of the present invention will be apparent from the following detailed description when read in conjunction with the accompanying drawings.

BRIEF DESCRIPTION OF THE DRAWINGS

FIG. 4 is a table for explaining a criterion for allowing a request for a request management part of the lower level apparatus shown in FIGS. 1 and 2 according to an embodiment of the present invention;

FIG. 8 is a diagram showing an example of a typical public key certificate generated according to the format shown in FIG. 7 according to an embodiment of the present invention;

FIG. 9 is a diagram showing an example of another public key certificate for comparing with a rescue public key certificate according to an embodiment of the present invention;

FIG. 10 is a diagram showing an example of a rescue public key certificate for comparing with a regular public key certificate according to an embodiment of the present invention;

FIGS. 23A and 23B are diagrams for explaining a relation between a root key, a root private key, and a public key certificate used in the authentication process shown in FIG. 22 according to an embodiment of the present invention.

DESCRIPTION OF THE PREFERRED EMBODIMENTS

In the following, embodiments of the present invention are described in detail with reference to the accompanying drawings.

Figure 1:
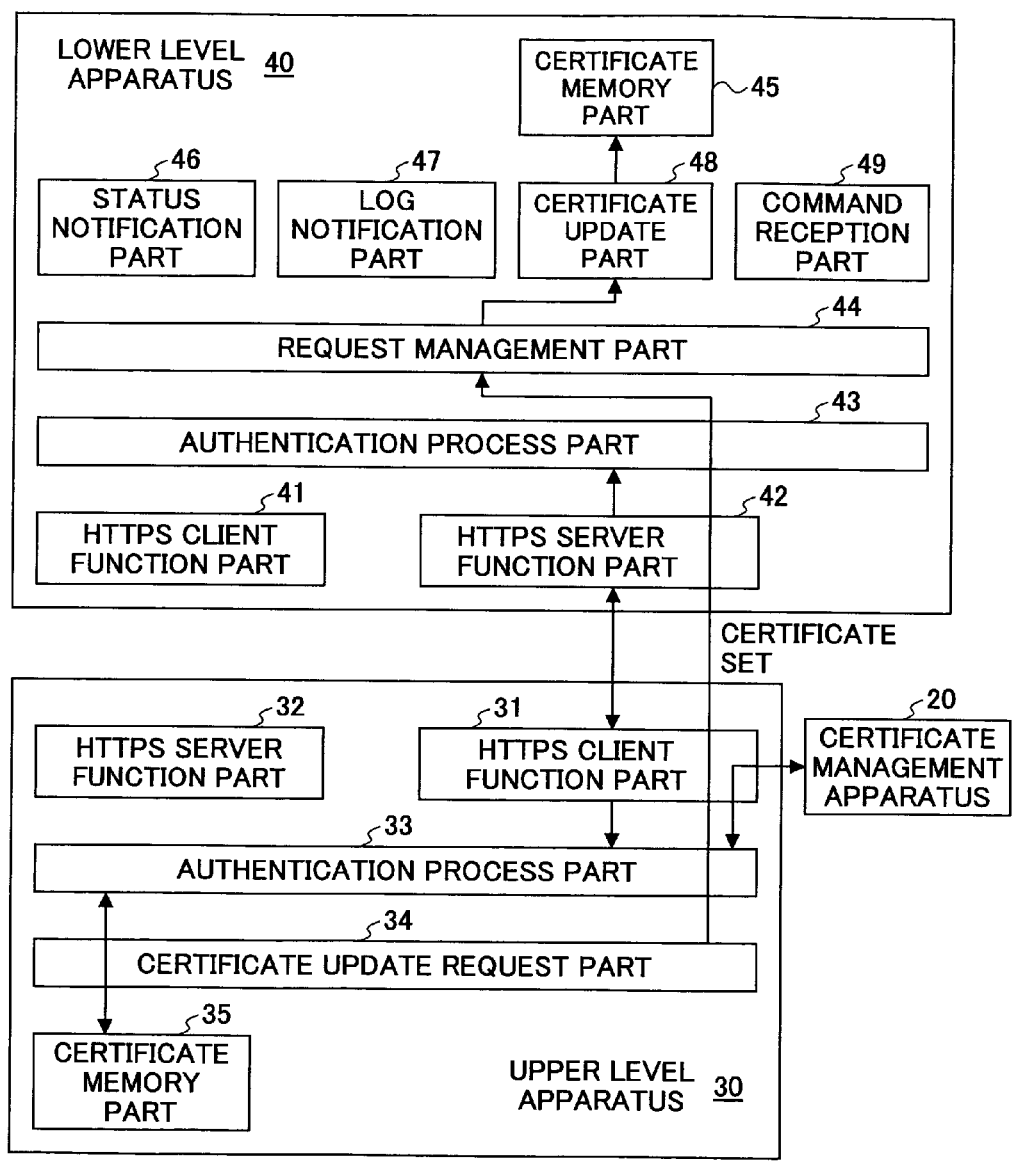
FIG. 1 is a function block diagram showing a communication system having an upper level apparatus and a lower level apparatus according to an embodiment of the present invention.
Figure 2:
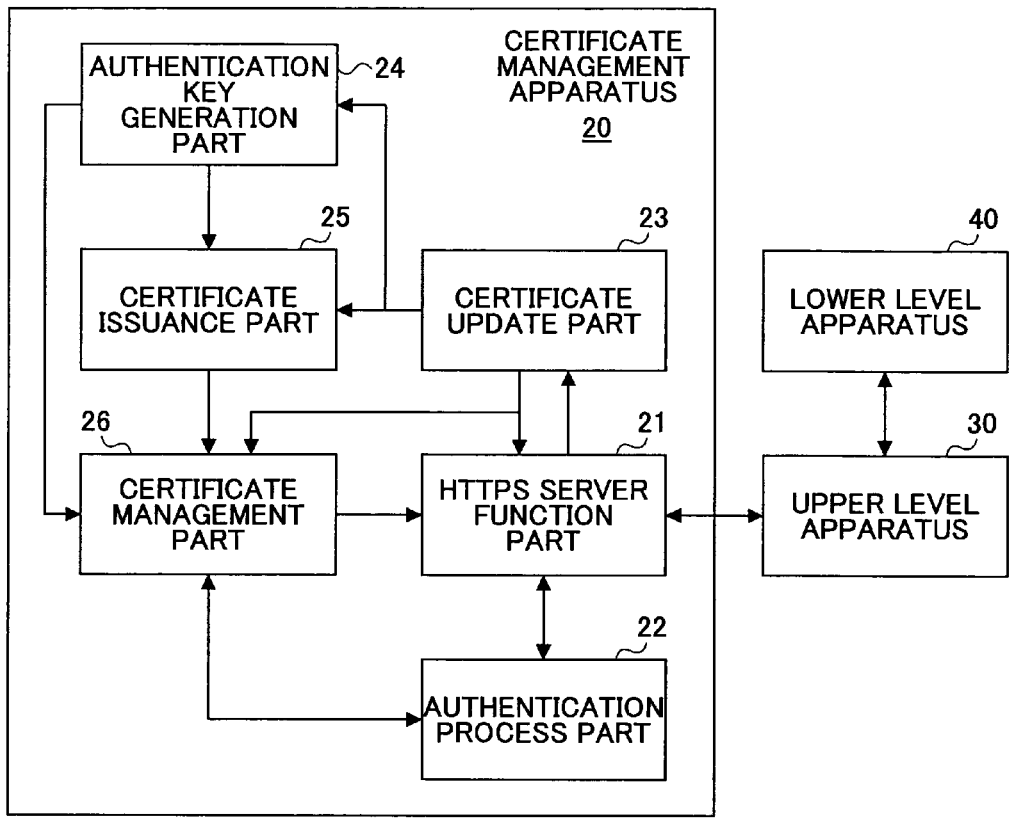
FIG. 2 is a function block diagram showing a certificate management apparatus communicable with the upper level apparatus shown in FIG. 1 according to an embodiment of the present invention.
Figure 3:
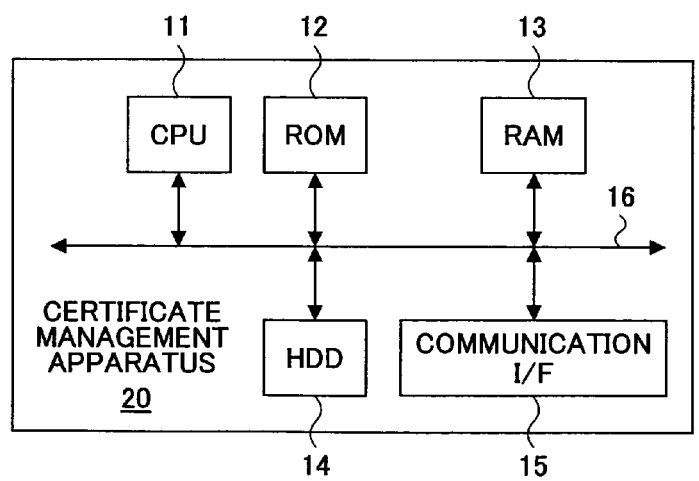
FIG. 3 is a block diagram showing a hardware structure of the certificate management apparatus shown in FIGS. 1 and 2 according to an embodiment of the present invention.

First, a communication apparatus and a communication system using the communication apparatus according to a first embodiment of the present invention are described. A communication system 100 according to the first embodiment of the present invention has an upper level apparatus (second communication apparatus) 30 and a lower level apparatus (first communication apparatus) 40. The communication system 100 allows communication between the upper level apparatus 30 and a certificate management apparatus 20 via a network for providing a digital certificate management system between a communication system and a certificate management system. FIG. 1 is a block diagram for describing functions (function parts) of the upper level apparatus 30 and the lower level apparatus 40, and FIG. 2 is a block diagram for describing functions (function parts) of the certificate management apparatus 20. In FIGS. 1-3, parts having no particular relation to the features of this embodiment are omitted. It is to be noted that, in this description of the present application, the term "digital certificate" refers to digital data having a signature attached thereto for preventing forgery.

According to the communication system 100, in a case where the upper level apparatus 30 attempts to establish a connection with the lower level apparatus 40, the connection with the lower level apparatus 40 is established when the lower level apparatus 40 is verified as an authentic communication opponent by using an authentication method using a public key code(s) and a digital certificate(s) in accordance with SSL protocol. Here, the communication system 100 functions as a client/server system where the lower level apparatus 40 executes a required process and replies in response to a request transmitted from the upper level apparatus 30.

On the other hand, in a case where the lower level apparatus 40 attempts to establish a connection with the upper level apparatus 30, the connection with the upper level apparatus 30 is established when the upper level apparatus 30 is verified as an authentic communication opponent also by using an authentication method using a public key code(s) and a digital certificate(s) in accordance with SSL protocol. Here, the communication system 100 functions as a client/server system where the upper level apparatus 30 executes a required process and replies in response to a request transmitted from the lower level apparatus 40.

In both of the above cases, the apparatus requesting connection (communication) corresponds to the client, and the other apparatus receiving the request corresponds to the server.

The certificate management apparatus 20, which is an apparatus issuing and managing digital certificates by using the above-described two-way authentication, corresponds to a CA (Certificate Authority).

It is to be noted that although a single lower level apparatus 40 is illustrated in FIGS. 1 and 2, plural lower level apparatuses 40 may alternatively be employed. Furthermore, although a single communication system 100 includes a single upper level apparatus 30, plural upper level apparatuses 30 may alternatively be provided inside a certificate management system as a result of allowing a single certificate management system 20 to communicate with plural communication systems 100.

In the communication system 100, each node of the certificate management apparatus 20, the upper level apparatus 30, and the lower level apparatus 40 (including communication between the upper level apparatus 30 and the lower level apparatus 40) are, in accordance with RPC (remote procedure call) allowed to transmit a "request" requesting execution of a process corresponding to a method in an application program installed in an opponent apparatus, and to obtain a "response" resulting from the execution of the requested process.

In order to achieve the RPC, known protocols, technologies, and specification may be employed, for example, SOAP (Simple Object Access Protocol), HTTP (Hyper Text Transfer Protocol), FTP (File Transfer Protocol), COM (Component Object Model), and/or CORBA (Common Object Request Broker Architecture).

Next, respective apparatuses and parts included in the communication system 100 are described in further detail.

FIG. 3 is a block diagram showing a hardware configuration of the certificate management apparatus 20 shown in FIG. 2. As shown in FIG. 3, the certificate management apparatus 20 includes a CPU 11, a ROM 12, a RAM 13, an HDD 14, and a communication interface (I/F) 15, in which the components are connected with a system bus 16. The CPU 11 executes various control programs stored in the ROM 12 and the HDD 14 for controlling operations of the certificate management apparatus 20, for example, issuing and/or managing digital certificates.

It is to be noted that a typical computer may be employed as the hardware of the certificate management apparatus 20, and additional hardware may be added thereto.

Furthermore, various configurations may be applied to the upper level apparatus 30 and the lower level apparatus 40 according to purpose (e.g. remote management, e-commerce). For example, in the case of remote management, the lower level apparatus 40, being a target management apparatus, may be, for example, an image processing apparatus (e.g. a printer, a facsimile apparatus, a copier, a scanner, a digital computer), and/or electronic apparatuses including a network home appliance, an automatic vending machine, a medical apparatus, an electric power apparatus, an air conditioning system, a metering system (e.g. gas, water, electricity), an automobile, and an aircraft, in which the upper level apparatus 30 may gather information from the target management apparatus, and transmit commands for achieving various operations.

Both the upper level apparatus 30 and the lower level apparatus 40 have a communication interface (I/F) for communicating with an external apparatus via, at least, a CPU, a ROM, a RAM, and/or a network, and a memory unit for storing information required for authentication. By using the CPU to execute a prescribed control program(s) stored in the ROM or the like, the feature functions according to an embodiment of the present invention can be achieved with an apparatus according to an embodiment of the present invention.

In this communication, various communication lines (communication paths) may be employed for building a network according to an embodiment of the present invention, in which the network can be wire-connected and/or wire-less.

FIG. 1 shows features of parts composing the above-described upper level apparatus 30 and the lower level apparatus 40.

The upper level apparatus 30 includes an HTTPS (Hypertext Transfer Protocol Security) client function part 31, an HTTPS server function part 32, an authentication process part 33, a certificate update request part 34, and a certificate memory part 35.

The HTTPS client function part 31 uses HTTPS protocol (including an authentication process and encoding process according to SSL) for requesting communication with an apparatus having an HTTPS server function, such as the lower level apparatus 40. In addition, the HTTPS client function part 31 has a function of transmitting a request (command) and/or data to a communication opponent, and enabling the communication opponent to execute an operation in accordance with the transmitted request and/or data.

The HTTPS server function part 32 receives (accepts) a communication request using HTTP protocol from an apparatus having an HTTPS client function, to thereby allow respective parts of an apparatus to execute an operation in response to the request and/or data received from the apparatus having the HTTPS client function, and return the result of the operation to the origin of the request.

The authentication process part 33 executes a function of an authentication unit, in which the authentication process part executes an authentication process, when the HTTPS client function part 31 or the HTTPS server function part 32 authenticates a communication opponent, by using a digital certificate received from the communication opponent, and/or by using various certificates, private keys, etc., stored in the certificate memory part 35. The authentication process part 33 also has a function of transmitting a digital certificate stored in the certificate memory part 35 via the HTTPS client function part 31 and/or the HTTPS server function part 32 for requesting authentication to the communication opponent.

The certificate update request part 34 has a certificate transmission unit for transmitting a regular public key to a communication opponent (e.g. lower level apparatus) in a predetermined case, and a certificate update unit for requesting storage of the transmission.

The certificate memory part 35 has functions of storing authentication information such as various certificates and private keys, and supporting the authentication process of the authentication process part 33. The types, usages, and generating methods regarding the certificates and private keys are described in more detail below.

The functions of each of the above-described parts are executed by enabling the CPU of the upper level apparatus 30 to execute a prescribed control program(s), to thereby control the operation of the respective parts of the upper level apparatus 30.

Meanwhile, the lower level apparatus 40 includes an HTTPS client function part 41, an HTTPS server function part 42, an authentication process part 43, a request management part 44, a certificate memory part 45, a status notification part 46, a log notification part 47, a certificate update part 48, and a command reception part 49.

Similar to the HTTPS client function part 31 of the upper level apparatus 30, the HTTPS client function part 41 uses HTTPS protocol (including an authentication process and encoding process according to SSL) for requesting communication with an apparatus having an HTTPS server function, such as the upper level apparatus 30. In addition, the HTTPS client function part 41 also has a function of transmitting a request (command) and/or data to a communication opponent, and enabling the communication opponent to execute an operation in accordance with the transmitted request and/or data.

Similar to the HTTPS server function part 32 of the upper level apparatus 30, the HTTPS server function part 42 receives (accepts) a communication request using HTTP protocol from an apparatus having an HTTPS client function, to thereby allow respective parts of an apparatus to execute an operation in response to the request and/or data received from the apparatus having the HTTPS client function, and return the result of the operation to the origin of the request.

Similar to the authentication process part 33 of the upper level apparatus 30, the authentication process part 43 executes a function of an authentication unit, in which the authentication process part executes an authentication process, when the HTTPS client function part 41 or the HTTPS server function part 42 authenticates a communication opponent, by using a digital certificate received from the communication opponent, and/or by using various certificates, private keys, etc. Here, however, various certificates and the like used in the authentication process are stored in the certificate memory part 45.

The request management part 44 determines whether an operation(s) corresponding to a request received from the upper level apparatus 30 can be executed. When execution of the request is allowed, the request management part 44 provides the request to function parts 46-49 serving to execute the operation in accordance with the request.

FIG. 4 shows a criterion for determining execution of the operation. The criterion is based on the type of the request and the type of digital certificate used in the authentication process by the authentication process part 43. Both the upper level apparatus 30 and the lower level apparatus 40 include a regular public key certificate which is a short term (public key) certificate being set with a validity term shorter than a long term certificate, and a rescue public key certificate which is a long term (public key) certificate being set with a validity term longer than the short term certificate. As shown in FIG. 4, the request management part 44 allows all operations when authentication is executed with the regular public key certificate, and allows only a certificate update operation when authentication is executed with the rescue public key certificate. It is to be noted that only the regular public key certificate is subject to the certificate update operation, and the rescue public key certificate is not subject to the certificate update operation. Therefore, the rescue public key certificate is a certificate which is only used in a case of storing a new regular public key certificate (and a private key and a root key certificate that are subordinate to the new regular public key certificate).

Similar to the certificate memory part 35 of the upper level apparatus 30, the certificate memory part 45 also has a function of storing authentication information such as various certificates, and private keys, and supporting the authentication process of the authentication process part 43. It is, however, to be noted that the certificates and the like stored in the certificate memory part 45 are different from those stored in the certificate memory part 35. The status notification part 46 has a function of providing (notifying) the status of the lower level apparatus 40 to the upper level apparatus 30 in a case where, for example, an abnormality is detected, or a command is issued by the user. This notification may be transmitted in response to a query from the upper level apparatus 30, or transmitted upon requesting communication from the HTTPS client function part 41 to the upper level apparatus 30.

The log notification part 47 has a function of reporting (notifying) a log between the lower level apparatus 40 and the upper level apparatus 30 (e.g. a log from the lower level apparatus 40 to the upper level apparatus 30). Other than an operations log of the lower level apparatus 40, the contents of the notified log may include, for example, count value obtained from an image formation amount counter of an image forming apparatus, or a measured value of a measuring system. Since this notification is not required to be used immediately, the notification may be transmitted in response to a query from the upper level apparatus 30.

The certificate update part 48 has a function of updating certificates and the like stored in the certificate memory part 45 in accordance with the certificates and the like received from the upper level apparatus 30.

The command reception part 49 has a function of executing an operation(s) corresponding to a request(s) of a function(s) other than the functions of the respective function parts 46-48. The operation may include, for example, transmitting data stored in the lower level apparatus 40, and/or controlling operation of an engine part (not shown).

The functions of each of the above-described parts are executed by enabling the CPU of the lower level apparatus 40 to execute a prescribed control program(s), to thereby control the operation of the respective parts of the lower level apparatus 40. It is to be noted that the functions of the status notification part 46 or the log notification part 47 are given as examples of the functions provided by the command reception part 49, and are functions that could be excluded.

FIG. 2 is a block diagram for describing functions (function parts) of the certificate management apparatus 20 according to an embodiment of the present invention.

The certificate management apparatus 20 includes an HTTPS server function part 21, an authentication process part 22, a certificate update part 23, an authentication key generation part 24, a certificate issuance part 25, and a certificate management part 26.

Similar to those of the upper level apparatus 30 and the lower level apparatus 40, the HTTPS server function part 21 receives (accepts) a communication request from an apparatus having an HTTPS client function, to thereby allow respective parts of an apparatus to execute an operation in response to the request and/or data received from the apparatus having the HTTPS client function, and return the result of the operation to the origin of the request.

Furthermore, the authentication process part 22 has a function similar to those of the upper level apparatus 30 and the lower level apparatus 40. Here, however, various certificates and the like used in the authentication process are stored in the certificate management part 26. The types, usages, and generating methods regarding the various certificates and the like are described in more detail below.

The certificate update part 23 has a function of allowing the authentication key generation part 24 or the certificate issuance part 25 to issue a new regular public key certificate of a target lower level apparatus 40, and allowing the certificate management part 26 to transmit the issued new regular public key certificate to the upper level apparatus 30 via the HTTPS server function part 21.

The authentication key generation part 24 has a function of an authentication key generation unit, in which the authentication key generation part 24 generates a root private key serving as an authentication private key used in making a digital signature, and an authentication public key (authentication key) corresponding to the root private key for verifying the authenticity of the digital certificate of the digital signature.

The certificate issuance part 25 has a function of issuing public keys used in the authentication process according to SSL protocol by the certificate management apparatus 20 itself, the upper level apparatus 30, and the lower level apparatus 40, and issuing private keys corresponding to the public keys. In addition, the certificate issuance part 25 has a function of a certificate issuance unit, in which the certificate issuance part 25 attaches a digital signature to the issued public keys by using the root private key made by the authentication key generation part 24, and issuing a public key certificate (i.e. digital certificate). Furthermore, the certificate issuance part 25 has a function of issuing a root key certificate having a digital signature attached to a root key.

The certificate management part 26 has a function of a certificate management unit, in which the certificate management part 26 manages the digital certificates issued by the certificate issuance part 25, the root private keys used in making the digital certificates, and the root keys corresponding to the root private keys. In addition, the certificates and keys are stored (managed) in correspondence with information such as validity term, issue target, ID, and/or update history. The certificate management part 26 also has a function of supporting the authentication process of the authentication process part 22 regarding certificates and private keys issued to itself.

The functions of each of the above-described parts are executed by enabling the CPU of the certificate management apparatus 20 to execute a prescribed control program(s), to thereby control the operation of the respective parts of the certificate management apparatus 20.

Figure 5A:
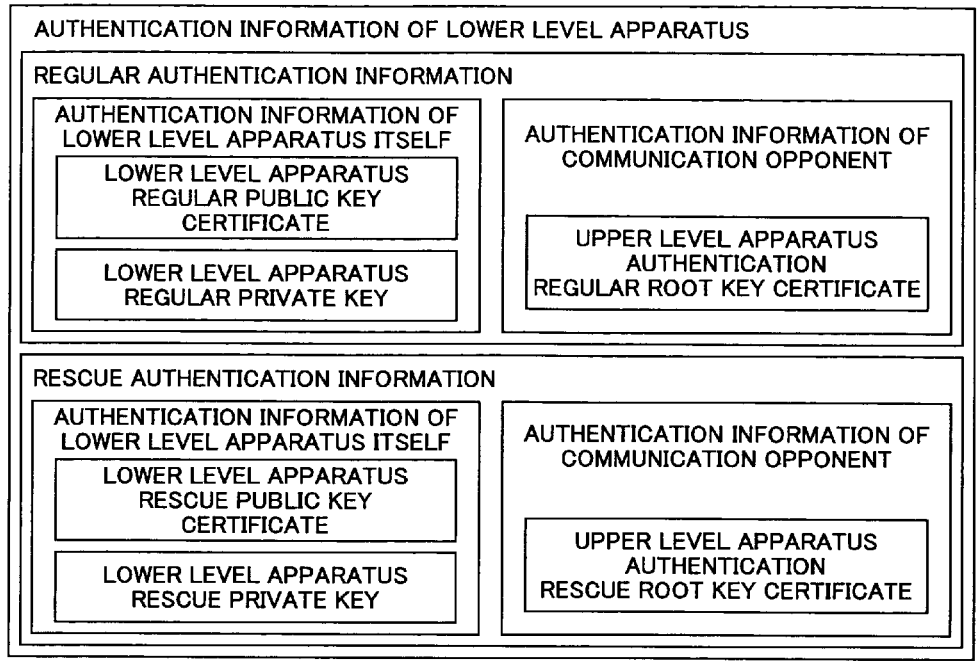
FIGS. 5A and 5B are diagrams showing authentication information stored in the upper level apparatus and the lower level apparatus shown in FIGS. 1 and 2 according to an embodiment of the present invention.
Figure 5B:
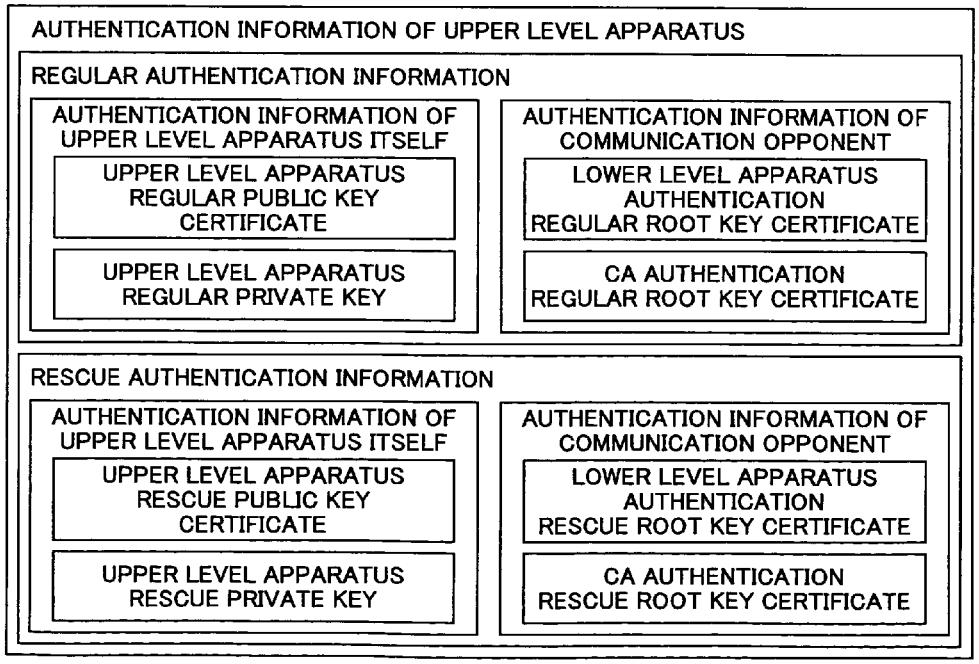
Figure 6:
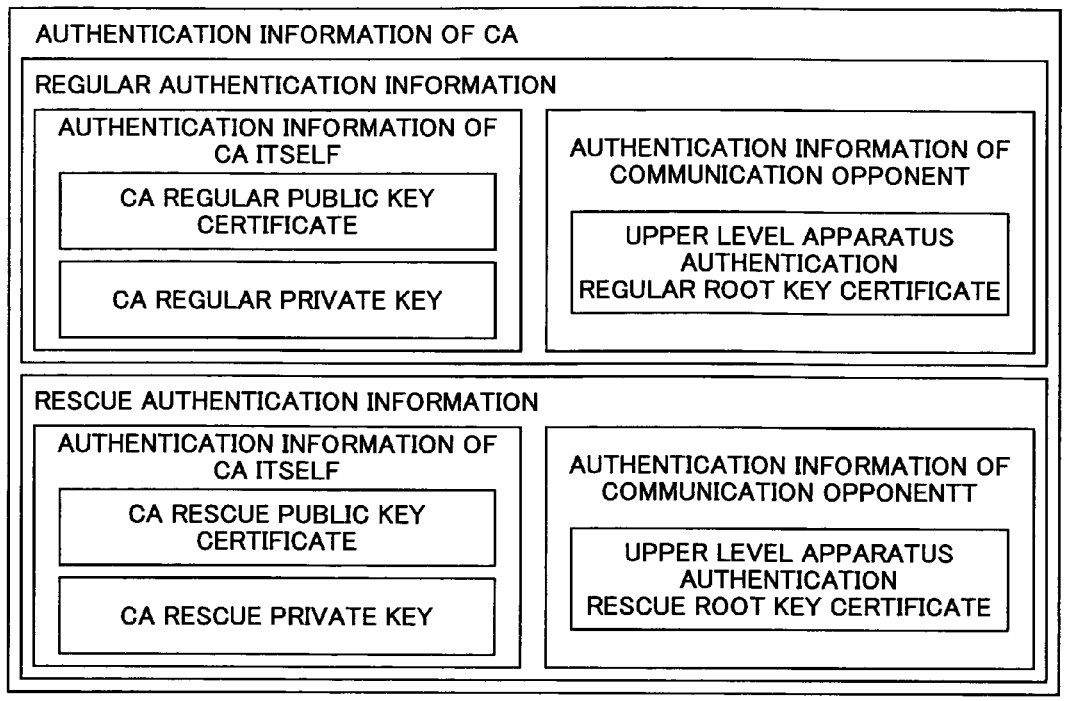
FIG. 6 is a diagram showing authentication information stored in the certificate management apparatus shown in FIGS. 1 and 2 according to an embodiment of the present invention.

Next, the features, usages, etc., of the certificates and the keys used in the above-described apparatuses are described. FIG. 5A is a diagram showing the types of certificates and keys stored in the certificate memory part 45 of the lower level apparatus 40, and FIG. 5B is a diagram showing the types of certificates and keys stored in the certificate memory part 35 of the upper level apparatus 30. Among the certificates and keys stored in the certificate management part 26 of the certificate management apparatus 20, the certificates and keys used in the authentication process of the certificate management apparatus 20 are shown in FIG. 6.

The information stored in the upper level apparatus 30, the lower level apparatus 40, and the certificate management apparatus 20 can be largely categorized into regular authentication information and rescue authentication information. Both the regular authentication information and the rescue authentication information are composed of authentication information regarding itself such as public key certificate information and private key information, and authentication information regarding the communication opponent such as root key certificate information.

Figure 24:
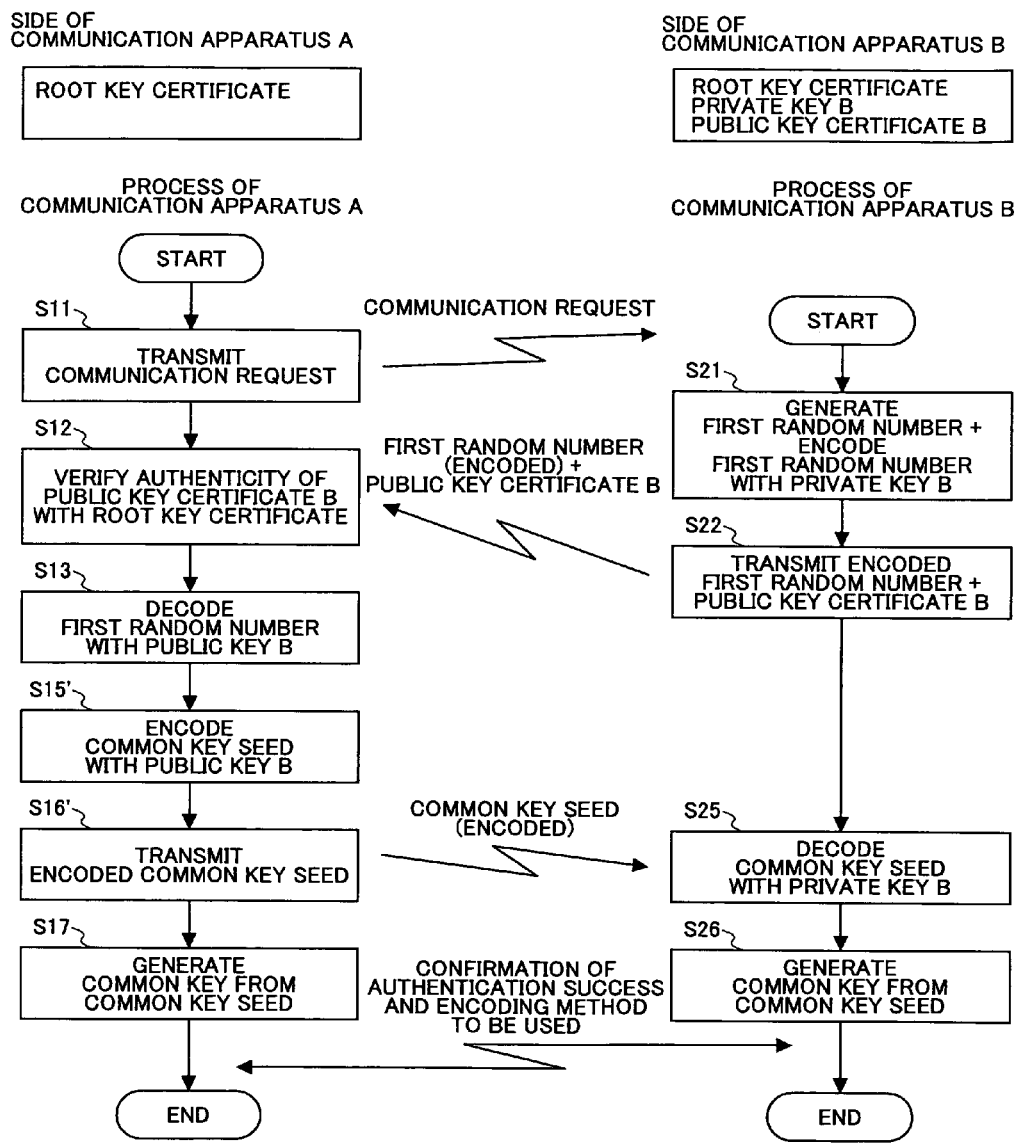
FIG. 24 is a flowchart corresponding to FIG. 22 which shows a process and information transmitted when executing one-way authentication between two communication apparatuses in accordance with SSL according to an embodiment of the present invention.

Accordingly, in a case of regular communication, each of the above-described apparatuses perform two-way authentication (as shown in FIG. 2) or one-way authentication (as shown in FIG. 24) using the regular authentication information according to SSL.

For example, a lower level apparatus regular public key certificate is a digital certificate having a digital signature attached to a regular public key issued by the certificate management apparatus 20 for the lower level apparatus 40, in which the digital signature allows its authenticity to be verified with a lower level apparatus authentication regular root key. The lower level apparatus regular public key certificate is a certificate corresponding to a short term certificate.

Figure 7:
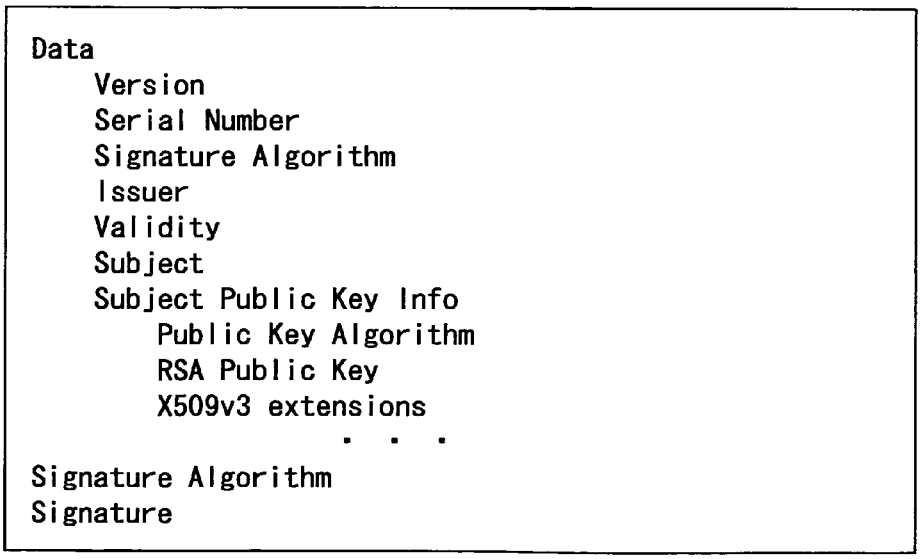
FIG. 7 is a diagram showing an example of a format of a regular public key certificate according to an embodiment of the present invention.

FIG. 7 shows an example of a format of a public key certificate. The format may not only include information of the public key itself, but may also include information such as issuer of the certificate, the validity of the certificate, and/or the subject of verification (e.g. an apparatus of a certificate issue target or user of such apparatus). More specifically, the public key certificate may be made in accordance with a format referred to as the X.509 format. FIG. 8 shows an example of a public key certificate made in accordance with the X.509 format.

In this example, letter A indicates identification information of the CA, and letter B indicates identification information of an apparatus of the certificate issue target. The identification information may include, for example, an address, a name, an apparatus number, or a code. Letter B indicates validity term designating a start date/time and a end date/time.

Furthermore, a lower level apparatus regular private key is a private key corresponding to the above-described lower level apparatus regular public key, and a lower level apparatus authentication regular root key certificate is a digital certificate having a digital signature attached to a lower level apparatus authentication regular root key, in which the digital signature allows its authenticity to be verified with a root private key corresponding to itself.

In a case where plural lower level apparatuses 40 are provided, the digital signature, which is to be applied to the regular public keys of respective apparatuses, is attached by using the same root private key, thereby a common regular root key certificate is used. The regular public key included in the regular public key certificate and the private key corresponding to the public key is different with respect to each of the apparatuses.

The above-described relation applies to that of an upper level apparatus regular public key certificate, an upper level apparatus regular private key, and an upper level apparatus authentication regular root key certificate; and also that of a CA regular public key certificate, a CA regular private key, and a CA authentication regular root key certificate.

Accordingly, in an exemplary case of performing two-way authentication between the upper level apparatus 30 and the lower level apparatus 40, the lower level apparatus 40, first, transmits a first random number encoded with the lower level apparatus regular private key along with the lower level apparatus regular public key certificate to the upper level apparatus 30 in response to a communication request from the upper level apparatus 30. The upper level apparatus 30, first, verifies the authenticity of the lower level apparatus authentication regular public key certificate (e.g. whether the certificate is damaged or tampered with) by using the lower level apparatus authentication regular root key certificate, and decodes the first random number with the public key in the public key certificate when the public key certificate is determined to be authentic. When the decoding is successful, the upper level apparatus 30 determines that the lower level apparatus 40 (communication opponent) is indeed the issue target of the lower level apparatus regular public key certificate, and the apparatus can be identified from the identification information included in the lower level apparatus regular public key certificate. The success of the authentication process depends on whether the identified apparatus is suitable for a communication opponent.

In a case where the authentication of the upper level apparatus 30 is successful, the lower level apparatus 40 receives a upper level apparatus regular public key certificate and a random number encoded with the upper level apparatus regular private key, and performs authentication using the stored upper level apparatus authentication root key certificate.

The above-described procedures is a process performed in a case where the HTTPS client function part 31 of the upper level apparatus 30 requests communication with the HTTPS server function part 42 of the lower level apparatus 40. The certificates and keys of the foregoing case are the same in a case where the HTTPS client function part 41 of the lower level apparatus 40 requests communication with the HTTPS server function part 32 of the upper level apparatus 30, the only difference being that the procedures performed by the upper level apparatus 30 and the lower level apparatus 40 are switched.

The same procedures (processes) are performed in communication between the upper level apparatus 30 and the certificate management apparatus 20.

As described above, in a case where respective apparatuses receives a regular public key certificate from a communication opponent, the authenticity of the regular public key certificate is denied unless the validity term indicated in the regular public key certificate has not expired. Therefore, authentication cannot be performed when the validity term is expired.

Therefore, in order to prevent this from occurring, a new public key certificate, which is to be used after the expiration of the validity term, is stored in each of the apparatuses before the expiration of the currently used public key certificate. However, an apparatus cannot be accessed from the outside in a case where the power of the apparatus is switched off, or a case where the apparatus is still stored in a warehouse or the like. Accordingly, a validity term may expire before a new public key certificate can be stored in the apparatus.

Supposing that each of the apparatuses can perform authentication only by using a regular public key certificate, there would be no other method for safely transmitting a new regular public key certificate, a regular private key, and/or a regular root key certificate to a target apparatus via a network in a situation where the validity term has expired. However, the communication system according to an embodiment of the present invention is able to handle such a situation by storing rescue authentication information so that a communication opponent can be authenticated by using two different types of digital certificates. By using the rescue authentication information, a new regular public key certificate and the like can be safely transmitted to a target apparatus via a network.

The rescue authentication information has a structure which is basically the same as that of the regular authentication information. For example, the lower level apparatus rescue public key certificate is a digital certificate having a digital signature attached to a rescue public key issued by the certificate management apparatus 20 for the lower level apparatus 40, in which the digital signature allows its authenticity to be verified with a lower level apparatus authentication rescue root key. The lower level apparatus rescue public key certificate is a certificate corresponding to a long term certificate. Furthermore, a lower level apparatus rescue private key is a private key corresponding to the above-described lower level apparatus rescue public key, and a lower level apparatus authentication rescue root key certificate is a digital certificate having a digital signature attached to a lower level apparatus authentication rescue root key, in which the digital signature allows its authenticity to be verified with a root private key corresponding to itself.

The rescue authentication information is different from the regular authentication information in that the validity term of the rescue public key certificate is set with a term longer than that of the regular public key certificate.

FIG. 9 shows an example of the regular public key certificate, and FIG. 10 shows an example of the rescue public key certificate.

Both the regular public key certificate in FIG. 9 and the rescue public key certificate in FIG. 10 are issued to the same apparatus, in which letters F and I in FIGS. 9 and 10, respectively, indicate the same identification information regarding the apparatus of the issue target. However, as shown in letter E of FIG. 9, the validity term of the regular public key certificate is a one year term starting from 0 o'clock A.M. of Jan. 1, 2003 and expiring on 0 o'clock A.M. of Jan. 1, 2004. On the other hand, as shown in letter H of FIG. 10, the validity term of the rescue public key certificate is a fifty year term starting from 0 o'clock A.M. of Jan. 1, 2000 and expiring on 0 o'clock A.M. of Jan. 1, 2050.

Furthermore, although the issuer for both certificates is the same CA of the XXX company, the CA of the regular public key certificate is "Regular CA" (as indicated with letter D in FIG. 9) and the CA of the rescue public key certificate is "Rescue CA" (as indicated with letter G in FIG. 10).

Although the rescue public key certificate having a long validity term may lack security compared to the regular public key certificate having a short validity term, authentication of a communication opponent can be performed even when the validity term of the regular public key certificate has expired by using the rescue public key certificate as long as the validity term of the rescue public key certificate has not expired. Subsequently, if the authentication is successful, a common key can be shared with the communication opponent and a secure transmission path can be obtained by encoding with use of the common key. Accordingly, by using the obtained transmission path, a new regular public key certificate can be transmitted and set for the communication opponent.

It is to be noted that, in the above-described case of performing the authentication process by using the rescue authentication information, the weakening of security to the extension of the validity term would not be a critical problem since only limited operations (e.g. update of the regular authentication information such as the regular public key certificate) are allowed to be executed.

Taking this point into consideration, it is preferable to provide a long validity term for the rescue public key certificate in a case where the validity term of the regular public key certificate has expired. More specifically, the validity term of the rescue public key certificate may be, for example, a product service life-span of the target apparatus. The product service life-span may be, for example, an estimated operating period, or an estimating running period, in which the life-span can be set according to, for example, a period of use estimated during development, estimated period of endurance, and/or quality guarantee period of the apparatus.

By setting the validity term of the rescue public key certificate longer than a period where the apparatus is assumed to function normally as long as maintenance of the apparatus is properly performed, the rescue public key certificate may be a certificate with an unexpiring validity term on condition that the apparatus is active (operational). Therefore, as long as the apparatus is active (operational), authentication using the rescue public key certificate (i.e. authentication using the rescue authentication information) can always be executed. Furthermore, since the rescue public key certificate requires no update, damage and the like in an update process can be prevented from occurring.

It is even more preferable when the validity term is set considerably longer than the above-described product service life-span or the operating period of the apparatus. In the example shown in FIG. 10, setting the validity period to fifty years may be considered sufficient for an average apparatus. However, the validity term is set to fifty years merely for the reason that the validity term according to the X.509 format can only be set to a maximum of fifty years. However, a longer validity term may also be set, for example, a term of one hundred years, or a term of several hundred years. The expiration date of the validity term is merely indicated for the sake of a request of the format of the public key certificate. Accordingly, the rescue public key certificate may be regarded as having substantially no expiration date. This may also apply to a case where the validity term is 20 years, 30 years, or even a further shorter period.

In addition, even if the validity term of the rescue public key certificate is shorter than the product service life-span, authentication using the rescue public key certificate can be performed in a case where the validity term of the regular public key certificate has expired as long as the validity term of the rescue public key certificate is longer than that of the regular public key certificate.

It is to be noted that the validity term of the regular public key certificate may be set with a suitable term with consideration for security, so that the validity term of the regular public key certificate often expires earlier than the product service life-span or expires when the apparatus is still in operation.

Meanwhile, in a case of executing an authentication process in accordance with SSL protocol, a server returns the same public key certificate when accessed by a predetermined URL (Uniform Resource Locator) since the server does not yet know the state of its client at the time of receiving a communication request from the client. Therefore, a single apparatus, ordinarily, cannot hold plural public key certificates, and selectively uses a type of public key certificate corresponding to the communication opponent for performing authentication. However, with the apparatuses according to an embodiment of the present invention shown in FIGS. 1 and 2, authentication can be performed using the regular public key certificate and the rescue public key certificate according to circumstance.

Next, an example of using the regular public key certificate and the rescue public key certificate according to circumstance is described with reference to FIG. 11. Although FIG. 11 shows only the upper level apparatus 30 and the lower level apparatus 40, the example may also apply to the certificate management apparatus 20.

As described above, a server can, basically, transmit only a particular public key certificate in response to a communication request from a client. However, in a case where addresses for receiving (accepting) the communication requests are different, different public key certificates can be returned according to the respective addresses. The addresses can be set, for example, in accordance with URL.

Figure 11:
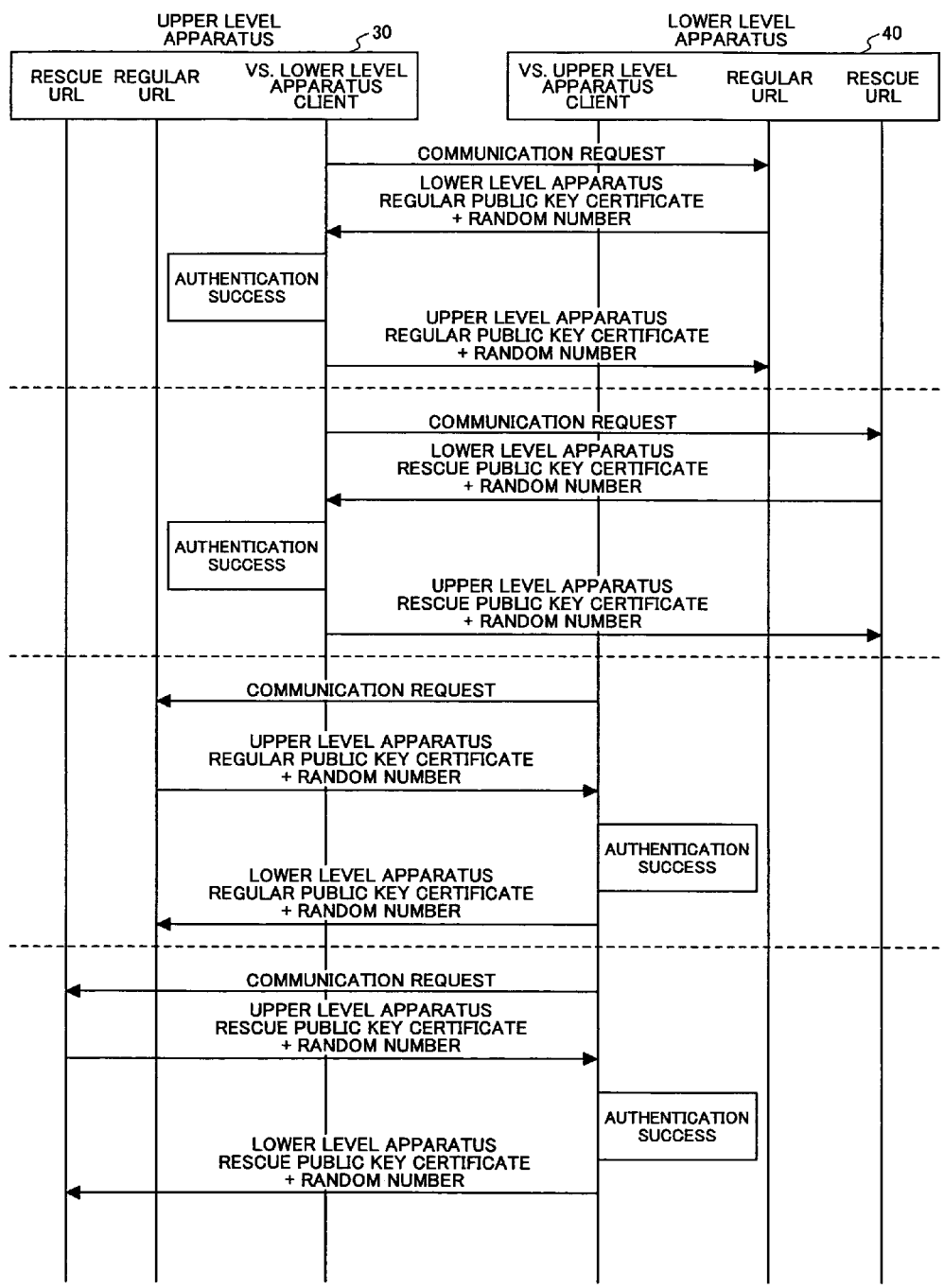
FIG. 11 is a diagram for explaining the upper level apparatus and the lower level apparatus shown in FIGS. 1 and 2 using a regular public key certificate and a rescue public key certificate according to an embodiment of the present invention.

In the example shown in FIG. 11, both the upper level apparatus 30 and the lower level apparatus 40 are provided with a regular URL for performing authentication with a regular public key certificate, and a rescue URL for performing authentication with a rescue public key certificate, in which an apparatus for requesting communication (apparatus (side) functioning as a client) transmits a communication request by selectively designating one of the URLs according to the type requested for authentication. Even in a case where the URLs physically correspond to a same apparatus, the URLs are set to logically correspond to different apparatuses by altering, for example, an IP address and/or a port number. That is, the URLs are set for attaining a function of a so-called virtual server.

Accordingly, an apparatus receiving the communication request (apparatus (side) functioning as a server) determines (distinguishes) the type of certificate to be returned according to the received URL, the apparatus being able to return a regular public key certificate when receiving a regular URL, and return a rescue public key certificate when receiving a rescue public key certificate.

Since the client having requested communication is aware of the URL to which the request was transmitted, the client is able to select and transmit the appropriate public key certificate corresponding to the URL in a case of executing two-way authentication.

When the upper level apparatus 30 executes authentication of the lower level apparatus 40, the upper level apparatus 30 first attempts the authentication by using a regular public key certificate. In a case where the authentication using the regular public key certificate fails due to expiration of the validity term of the regular public key certificate, the upper level apparatus 30 then attempts to authenticate using a rescue public key certificate. When the lower level apparatus 40 is an appropriate communication opponent (apparatus) where the validity term of the rescue public key certificate has not yet expired, the authentication using the rescue public key certificate succeeds. The upper level apparatus 30 has a function of updating the regular authentication information of the lower level apparatus 40 when the authentication is a success.

Hence, in a case where the upper level apparatus 30 requests communication with the lower level apparatus 40, the upper level apparatus 30 first transmits a communication request to the regular URL, and attempts authentication using the regular public key certificate. When the authentication using the regular public key certificate fails, the upper level apparatus 30 then transmits a communication request to the rescue URL, and attempts authentication using the rescue public key certificate. When the authentication using the rescue public key certificate succeeds, the upper level apparatus 30 obtains an update certificate set from the certificate management apparatus 20, transmits the obtained update certificate set to the lower level apparatus 40, and requests the lower level apparatus 40 to the store the update certificate set. The sharing of a common key can also be performed in the authentication process using the rescue public key certificate in the same manner as the authentication process using the regular public key certificate. Therefore, the transmission of the certificate set can be performed securely by encoding the certificate set with the common key.

Figure 12:
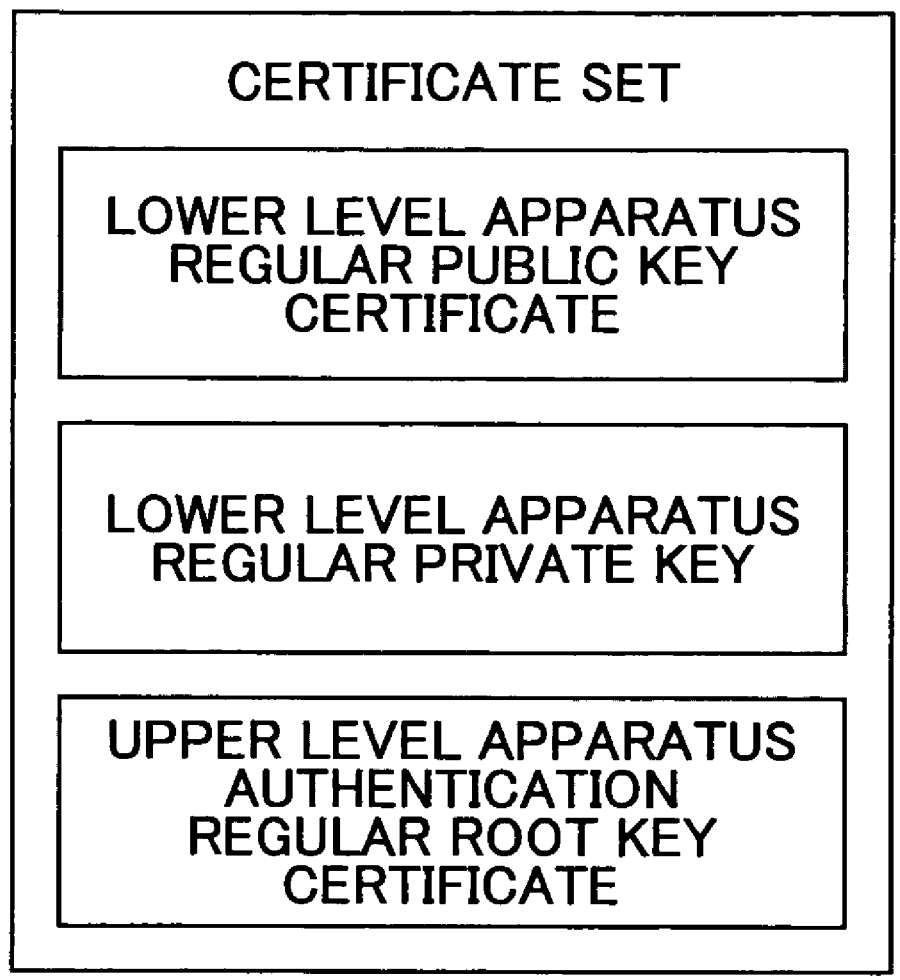
FIG. 12 is a diagram showing an example of a certificate set transmitted from the upper level apparatus to the lower level apparatus in updating the regular authentication information of a lower level apparatus in a communication system shown in FIGS. 1 and 2 according to an embodiment of the present invention.

FIG. 12 shows an example of the certificate set including regular authentication information that is to be stored in the lower level apparatus 40. The lower level apparatus regular public key certificate in the update certificate set has a validity term that is unexpired.

The root private key used in making the lower level apparatus regular public key certificate is a root key corresponding to the root key included in the lower level apparatus authentication regular root key certificate stored in the upper level apparatus 30 during obtainment. The upper level apparatus authentication regular public key certificate includes a root key for verifying authenticity of the digital signature attached to the upper level apparatus regular public key certificate stored in the upper level apparatus 30. Furthermore, in issuing the update certificate set, a new root private key may be issued, and the version of the public key certificate can be updated (issuing a public key certificate having a digital signature attached to a public key certificate by using a new root private key).

Meanwhile, when the lower level apparatus 40 receives a request to store the certificates, the received certificate set is stored in the certificate memory part 45, and the certificate update part 48 updates the regular authentication information with the received certificate set.

If the update is properly executed, an unexpired regular public key certificate can be newly stored in the lower level apparatus 40, thereby obtaining a state where authentication can be executed using the regular public key certificate. Thereafter, communication can be performed by the authentication process using the regular public key certificate.

In the authentication information shown in FIGS. 5 and 6, the root key certificate may not have to be dedicated to the authentication subject, but a same root key can also be used (for example, the upper level apparatus authentication root key certificate and the lower level apparatus authentication root key certificate can be the same). After the authenticity of the public key certificate is verified, the type or apparatus number of the apparatus can be identified by referring to identification information attached to the public key certificate.

Figure 13:
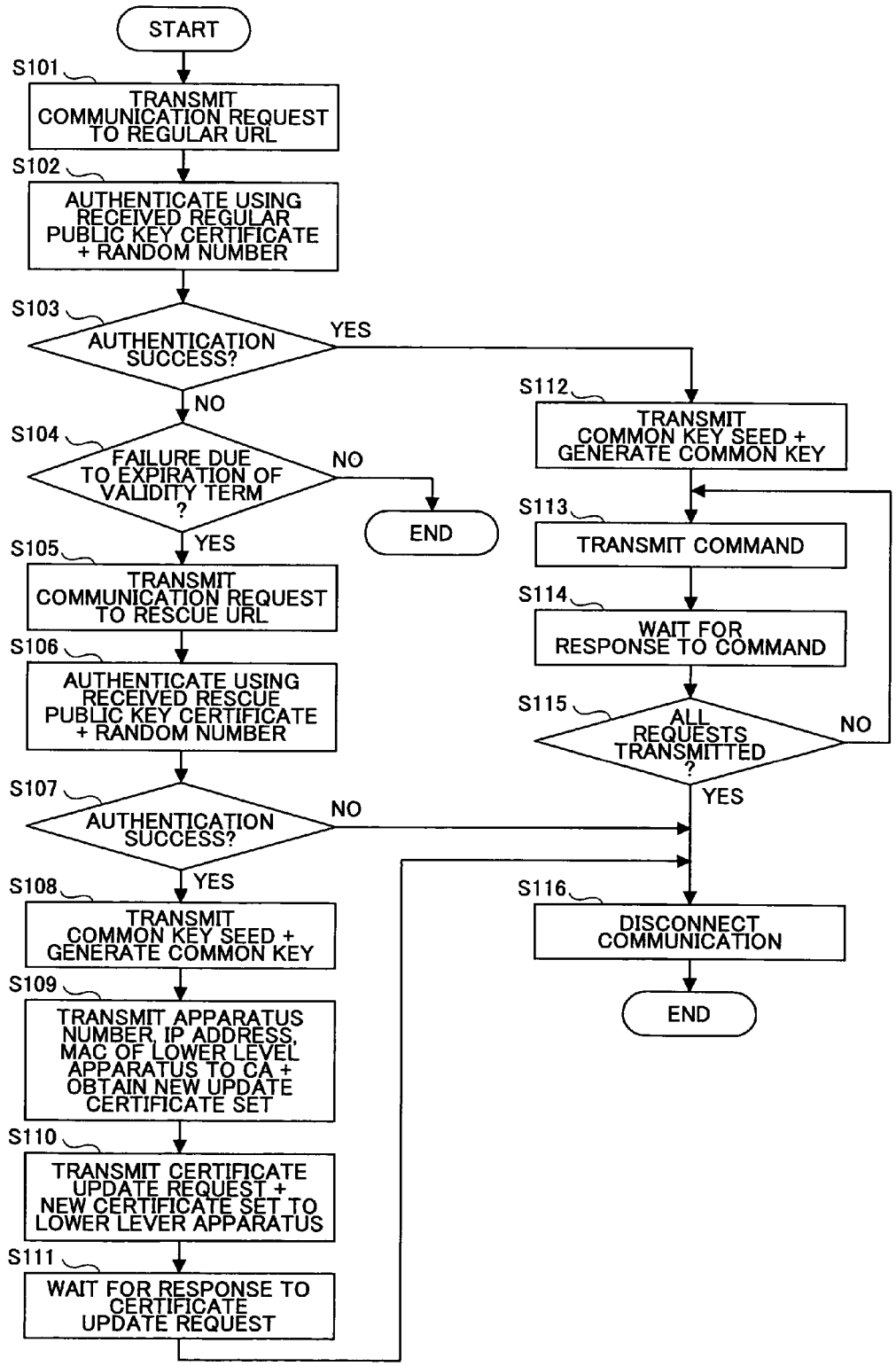
FIG. 13 is a flowchart showing an exemplary process executed by an upper level apparatus of a communication system in a case of updating a certificate using a regular public key certificate and a rescue public key certificate according to an embodiment of the present invention.
Figure 14:
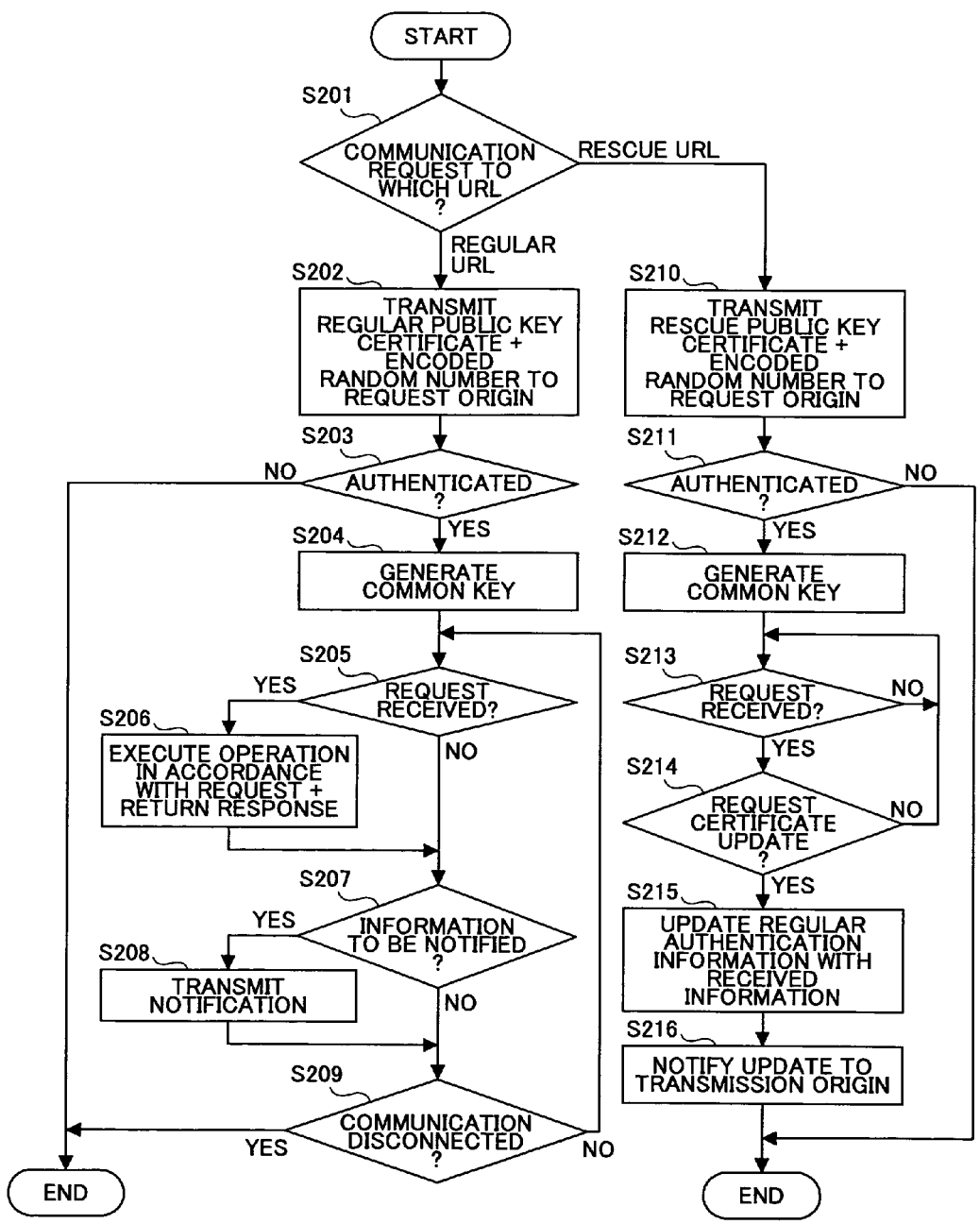
FIG. 14 is a flowchart showing an exemplary process executed by a lower level apparatus of a communication system in a case of updating a certificate using a regular public key certificate and a rescue public key certificate according to an embodiment of the present invention.

Next, a certificate updating process for two types of certificates including the regular public key certificate and the rescue public key certificate is described. FIG. 13 is a flowchart showing a process performed by the upper level apparatus 30 (upper level apparatus side), and FIG. 14 is a flowchart showing a process performed by the lower level apparatus 40 (lower level apparatus side). These processes are performed by the CPUs of the upper level apparatus 30 and the lower level apparatus 40 executing prescribed control programs. These processes are an example of a certificate transmission method according to an embodiment of the present invention.

Figure 22:
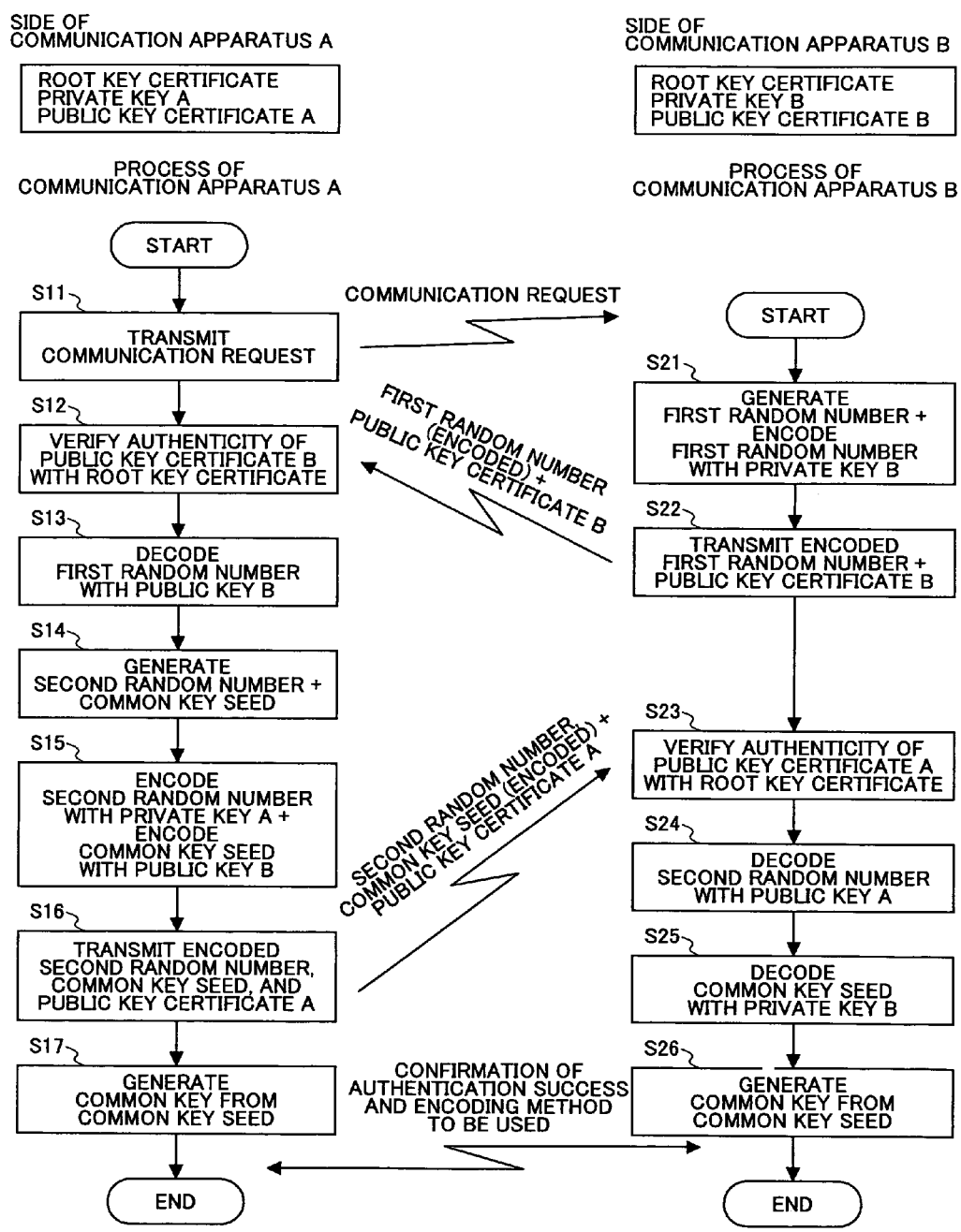
FIG. 22 is a flowchart showing a process and information transmitted when executing two-way authentication between two communication apparatuses in accordance with SSL according to an embodiment of the present invention.

The flowcharts in FIGS. 13 and 14 show the processes in a case where the upper level apparatus 30 requests communication with the lower level apparatus 40. For the sake of convenience, the authentication process in this example is performed by having the upper level apparatus 30 authenticate the lower level apparatus 40 by using a public key certificate received from the lower level apparatus 40 (one-way authentication process as shown in FIG. 24). However, cross-certification as shown in FIG. 22 may also be applied to this example, in which a public key certificate is also transmitted from the upper level apparatus 30 to the lower level apparatus 40.

The process shown in the flowchart of FIG. 13 is started in a case where the upper level apparatus 30 seeks to transmit a request or notification to the lower level apparatus 40, or a case where the upper level apparatus 30 seeks to request communication for receiving a request or notification from the lower level apparatus 40. In Step S101, the upper level apparatus 30 transmits a communication request to the regular URL. It is to be noted that the regular URLs and rescue URLs corresponding to all apparatuses of the communication opponents are stored in the upper level apparatus 30.

The lower level apparatus 40, then, starts the process shown with the flowchart in FIG. 14 upon receiving the communication request. In Step S201, the lower level apparatus 40 determines whether the URL that receives the communication request is a regular URL or a rescue URL.

If the communication request is addressed to the regular URL, the lower level apparatus 40 transmits a regular public key certificate and a first random number encoded with a regular private key (lower level apparatus regular private key) to the upper level apparatus 30 (Step S202). The above-described operations correspond to Steps S21 and S22 of FIGS. 22 and 24.

On the side of the upper level apparatus 30, the upper level apparatus 30 executes an authentication process when receiving a response from the lower level apparatus 40, or when a predetermined time has elapsed (Step S102). This authentication process uses a lower level apparatus authentication regular root key certificate, and corresponds to Steps S12 and S13 of FIG. 22 or 24.

Then, the upper level apparatus 30 determines whether the authentication process succeeds (Step S103). If the authentication process is a success (YES in Step S103), the upper level apparatus 30 transmits a seed of a common key (common key seed) to the lower level apparatus 40, and generates the common key that is to be used in later-on communications (Step S112). This process corresponds to Steps S14 through S17 in FIG. 22 or 24.

On the side of the lower level apparatus 40, the lower level apparatus 40 waits for a reply in response to the transmittal of the regular public key certificate for determining the result of the authentication (Step S203). The lower level apparatus 40 determines that the authentication is a success when receiving the common key seed from the upper level apparatus 30 (YES in Step S203), and generates the common key that is to be used in later-on communications (Step S204). In a case where an authentication failure response is received, or where no response is transmitted from the upper level apparatus 30 within a predetermined time, the lower level apparatus 40 determines that the authentication is a failure, and ends the process (No in Step S203). These processes correspond to Steps S23 to S26 of FIG. 22 or Steps 25 and 26 of FIG. 24.

On the side of the upper level apparatus 30, the upper level apparatus 30, subsequent to Step S112, transmits a request (command) along with prescribed data to the lower level apparatus 40 (Step S113). Then, the upper level apparatus 30 waits for a reply (response) in response to the transmitted request (Step S114). Then, the upper level apparatus 30 determines whether all requests are transmitted (Step S115). If there still is a request remaining, the process returns to Step S113 and the process is repeated (NO in Step S115). If all requests are transmitted (YES in Step S115), the communication is disconnected (Step S116), and the process is finished.

On the side of the lower level apparatus 40, the lower level apparatus 40 determines whether a request from the upper level apparatus 30 is received (Step S205). If the request from the upper level apparatus 30 is received (YES in Step 205), the lower level apparatus 40 executes a process in accordance with the request and returns a response to the upper level apparatus 30 (Step S206). Further, the lower level apparatus 40 determines whether there is any information to be reported to the upper level apparatus 30 (Step S207). If there is such information, the lower level apparatus 40 transmits a notification to the upper level apparatus 30 (Step S208). Then, the lower level apparatus 40 determines whether the upper level apparatus 30 has disconnected communications (Step S209). If the communications are not disconnected (NO in Step S209), the process returns to Step S205. If the communication is disconnected (YES in Step S209), the process is finished.

Meanwhile, on the side of the upper level apparatus 30, in a case where the authentication process is a failure (NO in Step S103), the upper level apparatus 30 determines whether the cause of the failure is due to expiration of the validity term (Step S104). As for the causes of the authentication failure, there are, for example, expiration of the validity term of the public key certificate, failure in confirming authenticity due to non-conformity between the version of the public key certificate and the root key certificate, a damaged public key certificate, no transmittal of the public key certificate, communications with a completely different apparatus, and/or an inappropriate apparatus for a communication opponent according to identification information attached to the public key certificate. If the upper level apparatus 30 determines that the failure is due to a cause other than the expiration of the validity term of the public key certificate (NO in Step S104), the process is finished.

The processes of Step S105 and those following are executed for storing a new regular public key certificate for the communication opponent in a case where the validity term of the regular public key certificate is expired. It is to be noted, however, that an alternative measure may be taken when the upper level apparatus determines that the failure is due to a cause other than the expiration of the validity term of the public key certificate (e.g. non-conformity of the version of the public key certificate, no reception of an appropriate public key certificate).

Meanwhile, when the upper level apparatus 30 determines that the failure is due to the expiration of the validity term of the public key certificate (YES in Step S104), the upper level apparatus 30 transmits a communication request to a rescue URL of the lower level apparatus 40.

In this case, the lower level apparatus 40 starts the process shown in the flowchart of FIG. 14 again; however, here in this case, the lower level apparatus 40 determines that the communication request is addressed to the rescue URL in Step S201. Then, the lower level apparatus 40 transmits a lower level apparatus rescue public key certificate and a first random number encoded with a rescue private key (lower level apparatus rescue private key) to the upper level apparatus 30 (Step S210). Similar to Step S202, these processes correspond to the Steps S21 and S22 of FIG. 22 or FIG. 24.

On the side of the upper level apparatus 30, the upper level apparatus 30, upon receiving the rescue public key certificate and the encoded first random number transmitted in Step S210, executes an authentication process (Step S106). This authentication process is executed with the lower level apparatus authentication rescue root key certificate, and corresponds to the Steps S12 and S13 of FIG. 22 or FIG. 24.

The authentication process may be determined as a failure when there is no reception within a predetermined time after Step S105. The CPU of the upper level apparatus 30 functions as an authentication unit for the processes of Steps S105 and S106.

Then, the upper level apparatus 30 determines whether the authentication process is a success (Step S107). If the authentication process is a success (YES in Step S107), a common key seed is transmitted to the lower level apparatus 40, and the common key is generated for later-on communications (Step S108). These processes, like those of Steps S103 and S112, correspond to Steps S14 through S17 of FIG. 22 or FIG. 24.

On the side of the lower level apparatus 40, the lower level apparatus 40 waits for a reply in response to the transmittal in Step S210 for determining the result of the authentication (Step S211). The lower level apparatus 40 determines that the authentication is a success when receiving the common key seed from the upper level apparatus 30 (YES in Step S211), and generates the common key that is to be used in later-on communications (Step S212). In a case where an authentication failure response is received, or where no response is transmitted from the upper level apparatus 30 within a predetermined time, the lower level apparatus 40 determines that the authentication is a failure, and ends the process (No in Step S211). These processes, like Steps S203 and S204, correspond to Steps S23 to S26 of FIG. 22 or Steps 25 and 26 of FIG. 24.

Meanwhile, on the side of the upper level apparatus 30, the upper level apparatus 30 determines that the lower level apparatus 40 is an appropriate apparatus for a communication opponent after the authentication process using the rescue public key certificate is a success (YES in Step S107). Subsequent to Step S108, the upper level apparatus 30 transmits prescribed information to the certificate management apparatus 20 for allowing the certificate management apparatus 20 (CA) to generate a new update certificate set, and obtains the generated new update certificate set, so as to update the regular public key certificate of the lower level apparatus 40 (Step S109). Further details of this process are described below.

The upper level apparatus 30, after obtaining the new certificate set from the certificate management apparatus 20, transmits a certificate update request and the new certificate set to the lower level apparatus 40 for requesting for the regular authentication information stored in the lower level apparatus 40 to be updated with the contents of the new certificate set (Step S110). In this process, the CPU of the upper level apparatus 30 functions as a certificate transmission unit.

Then, the upper level apparatus 30 waits for a prescribed response (reply) from the lower level apparatus 40 (Step S111). Subsequent to Step S111, the upper level apparatus 30 disconnects communication, to thereby end the process. In a case of re-transmitting an originally transmitted request or the like, the upper level apparatus 30 may start the process again from the beginning. However, the upper level apparatus 30 may also execute the process from Step S103 to S113, and further transmit requests to the lower level apparatus 40 since authentication using the regular public key certificate is likely to succeed by this point.

Meanwhile, on the side of the lower level apparatus 40, the lower level apparatus 40, subsequent to Step S212, waits to receive a prescribed request from the upper level apparatus 30 (Step S213). The process advances to Step S214 when the lower level apparatus 40 receives a request from the upper level apparatus 30 (YES in Step S213). Then, the lower level apparatus 30 determines whether the request is a certificate update request (Step S214). Here, as described above, the request management part 44 of the lower level apparatus 40 only allows execution of a certificate update operation in a case where the rescue public key certificate is used in the authentication process (See FIG. 4). If the request is not the certificate update request (NO in Step S214), the lower level apparatus 40 ignores the request, and returns to Step S213 to wait for the next request. Here, the lower level apparatus 40 may alternatively return a response reporting that the request cannot be accepted.

If the request is the certificate update request (YES in Step S214), the lower level apparatus 40 stores the new certificate set received along with the certificate update request in the certificate memory part 45, and updates its regular authentication information (as shown in FIG. 5A) with the contents of the new certificate set (Step S215). Then, the lower level apparatus 40 reports the update results in response to the request transmitted from the upper level apparatus (Step S216). Then, the process is finished.

Figure 15:
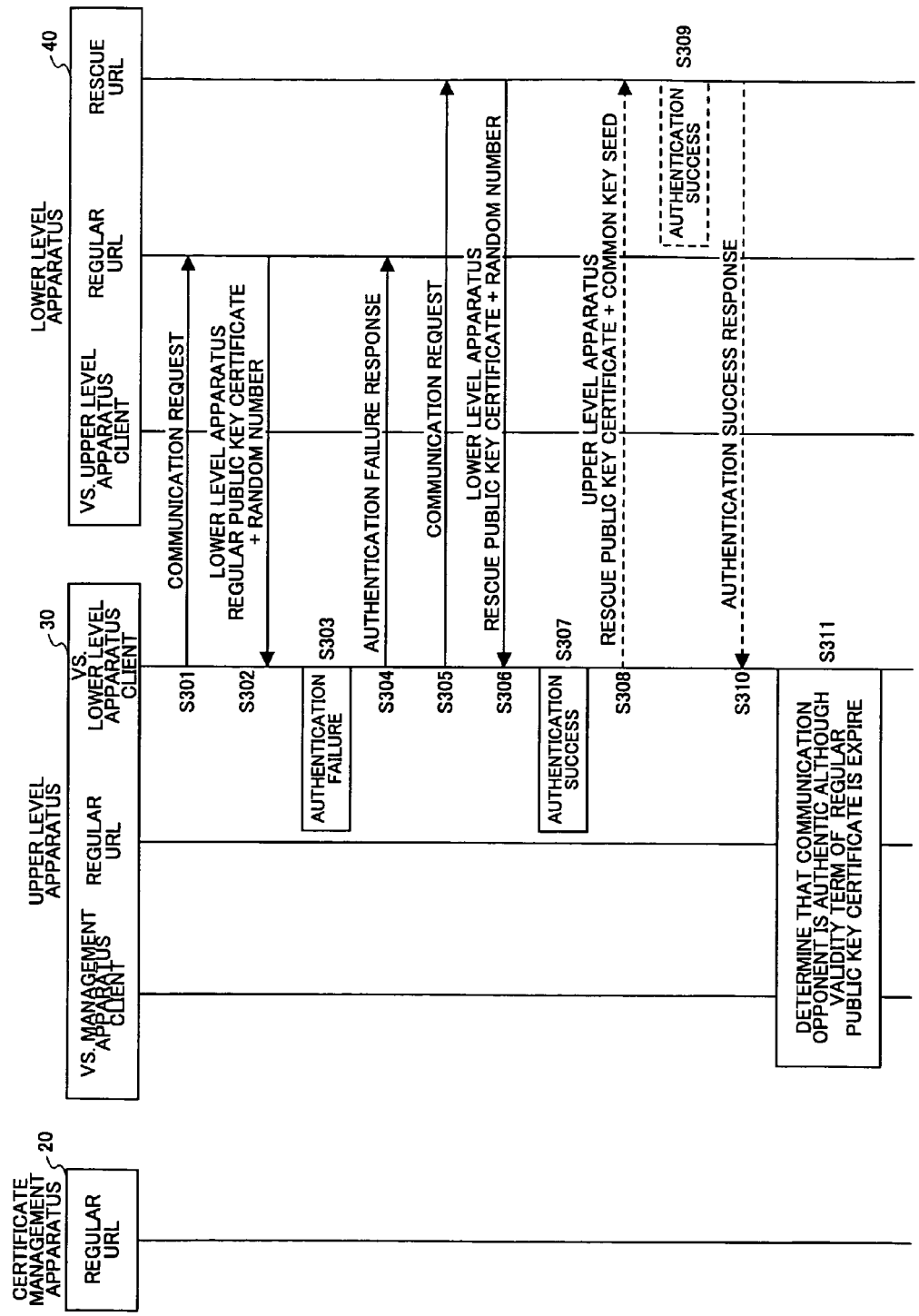
FIG. 15 is a diagram showing an exemplary sequence operation in a case of executing the processes shown in FIGS. 13 and 14 with a communication system according to an embodiment of the present invention.
Figure 16:
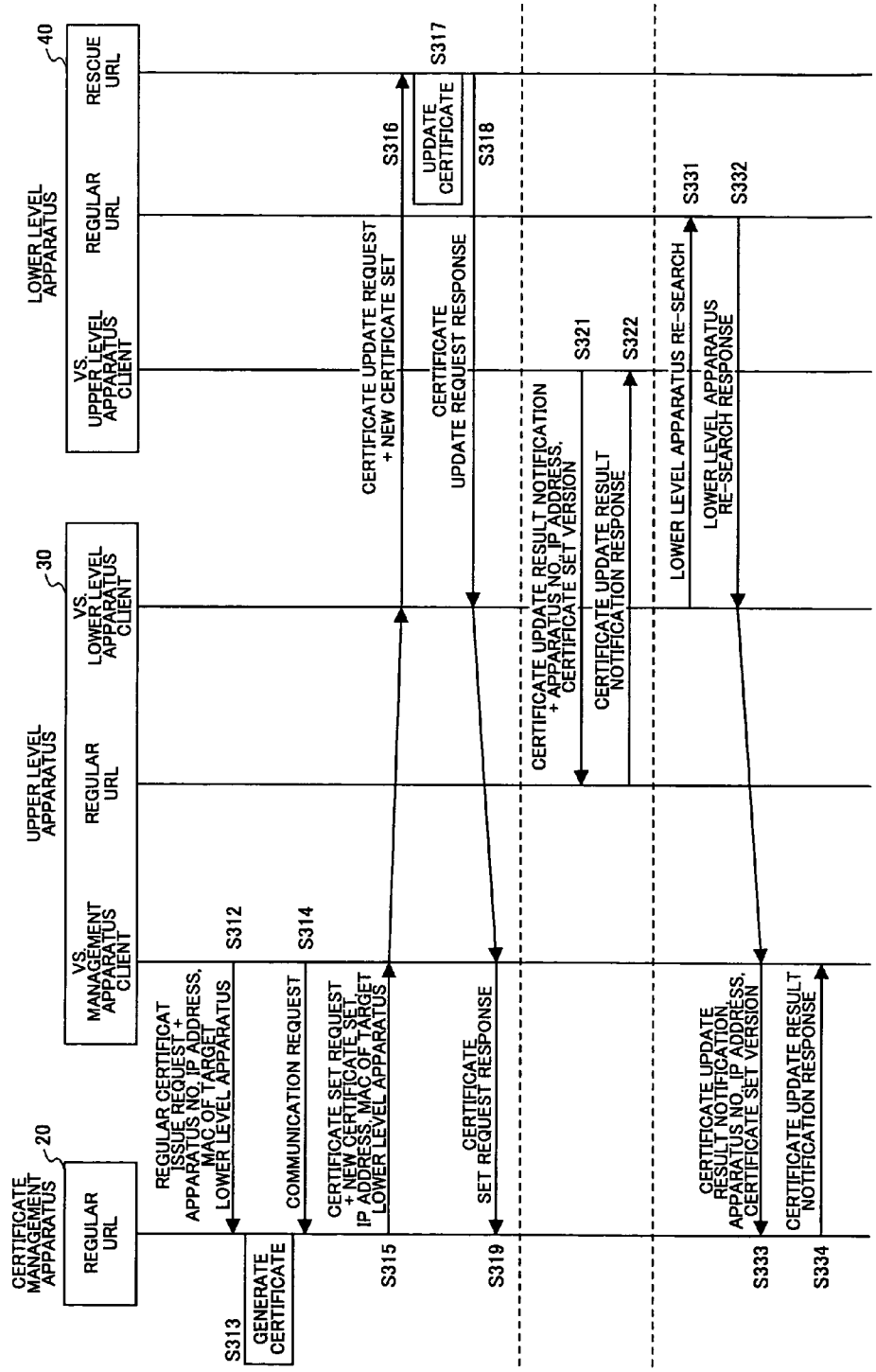
FIG. 16 is a continuation of the diagram shown in FIG. 15.

Next, an example of executing the processes of the upper level apparatus 30 and the lower level apparatus 40 shown in FIGS. 13 and 14 along with the process of the certificate management apparatus 20 is described as a sequence operation with reference to FIGS. 15 and 16. It is to be noted that this example is described in a case where the validity term of the lower level apparatus regular public key certificate stored in the lower level apparatus 40 is expired.

In this example, the upper level apparatus 30 has the HTTPS client function part 31 function as a lower level apparatus client, and transmits a communication request to the regular URL of the lower level apparatus 40 (S301). In this case, the request is received at the HTTPS server function part 42 of the lower level apparatus 40, and is reported to the authentication process part 43. Furthermore, in this case, authentication using the regular public key certificate is requested with the lower level apparatus 40. Then, the authentication process part 43, in accordance with SSL protocol, returns a random number encoded with the lower level regular private key stored in the certificate memory part 45 along with the lower level apparatus regular public key certificate (also stored in the certificate memory part 45) to the upper level apparatus 30 (S302).

The upper level apparatus 30, upon receiving the lower level apparatus regular public key certificate, attempts an authentication process. However, the upper level apparatus 30 determines that the authentication process is a failure since the validity term of the lower level apparatus regular public key certificate is expired (S303). Then, the upper level apparatus 30 returns an authentication failure response to the lower level apparatus 40 (S304).

Then, the upper level apparatus 40 transmits a communication request to the rescue URL of the lower level apparatus 40 in an attempt to execute authentication using a certificate with a validity term longer than that of the regular public key certificate (S305).

In a similar manner as Step S301, the request is reported to the authentication process part 43 of the lower level apparatus 40. Only in this case, authentication using the rescue public key certificate is requested with the lower level apparatus 40. Then, the authentication process part 43, in accordance with SSL protocol, returns a random number encoded with the lower level rescue private key stored in the certificate memory part 45 along with the lower level apparatus rescue public key certificate (also stored in the certificate memory part 45) to the upper level apparatus 30 (S306).

The upper level apparatus 30, upon receiving the lower level apparatus rescue public key certificate, attempts an authentication process. The upper level apparatus 30 determines that the authentication process is a success on condition that the lower level apparatus is an appropriate apparatus for a communication opponent and that the validity term of the lower level apparatus rescue public key certificate is not expired (S307). Then, in a case of one-way authentication, the upper level apparatus 30 returns a common key seed encoded with the public key included in the lower level rescue public key certificate to the rescue URL of the lower level apparatus 40. In a case of two-way authentication, the upper level apparatus 30 returns a second random number encoded with the upper level apparatus rescue private key stored in the certificate memory part 35 along with the upper level apparatus rescue public key certificate to the rescue URL of the lower level apparatus 40 (S308).

The lower level apparatus 40 sends the information received from the upper level apparatus 30 to the authentication process part 43, and decodes the common key seed using the lower level apparatus rescue private key. Furthermore, in the case of two-way authentication, the lower level apparatus, after verifying authenticity of the upper level apparatus rescue public key certificate with the upper level apparatus authentication root key certificate, executes the authentication process by decoding the second random number with the public key included in the public key certificate. Since the authentication process is executed appropriately in this case, the lower level apparatus determines that the authentication process is a success (S309), and returns an authentication success response to the upper level apparatus 30 (S310). Then, the common key is generated from the common key seed transmitted between the upper level apparatus 30 and the lower level apparatus 40 in Step S308 (not shown in drawing).

Meanwhile, the upper level apparatus 30, upon receiving the response in Step S310, determines that the communication opponent requested for communication in Step S301 is an apparatus that is a suitable communication opponent although the validity term of the regular public key certificate is expired (S311).

Then, continuing to the process shown in FIG. 16, the HTTPS client function part 31 of the upper level apparatus 30 functions as a management apparatus client, and requests generation (making) of a new certificate set for the lower level apparatus 40 by transmitting a regular certificate issue request, an apparatus number, an IP address, and the MAC address of the lower level apparatus 40 to the certificate management apparatus 20 (S312).

The information that is to be transmitted from the upper level apparatus 30 to the certificate management apparatus 20 may be stored as communication opponent information in the upper level apparatus 30 beforehand, or may be transmitted from the lower level apparatus 40 after succeeding at authentication with the rescue public key certificate. Although the certificate set includes respective certificates and the private key (as shown in FIG. 12), the upper level apparatus authentication regular root key certificate may be omitted from the certificate set in the case of one-way authentication. Similar to the communications between the upper level apparatus 20 and the lower level apparatus 40, the upper level apparatus 30 and the certificate management apparatus 20 may communicate by executing an authentication process with a regular public key certificate in accordance with SSL protocol (although not shown in the drawing), so that a secure communication path can be obtained.

The certificate management apparatus 20 generates the certificate set and a certificate set request (S313). The public key certificate included in the certificate set has a validity term that is not yet expired. For example, the validity term may be set to start from the point of generating the certificate set and end at after the elapsing of a predetermined period.

Since the certificate management apparatus 20 manages a version of the lower level apparatus authentication regular root key certificate stored by the upper level apparatus 30, the certificate management apparatus 20 is able to generate a regular public key certificate with a digital signature that can be verified with the lower level apparatus authentication regular root key. The regular public key certificate is included with identification information of the lower level apparatus 40, such as the apparatus no. of the lower level apparatus 40. In this process, the certificate management apparatus 20 may verify whether the issue target of the regular public key certificate is an appropriate apparatus by comparing the information (IP address, etc.) received from the upper level apparatus 30 with information managed by the certificate management apparatus 20 itself. As described above, a root private key used for the digital signature may be newly generated, to thereby update the root key certificate at the same time. The newly generated certificates and key(s) are stored and managed by the certificate management part 26 in the same manner as the former certificates and the like.

Subsequent to transmitting the request in Step S312, the upper level apparatus 30 transmits a communication request to the certificate management apparatus 20 substantially at a timing where the generation of the certificate set is completed, and queries whether there are any requests from the certificate management apparatus 20 (S314). If the process of Step S313 is completed, the certificate management apparatus 20, in response to the communication request from the upper level apparatus 30, transmits the certificate set request, the new certificate set, and the IP address and MAC address of the lower level apparatus 40 (in which the new certificate set is to be stored) to the upper level apparatus 30 (S315). That is, the upper level apparatus 30 obtains the certificate set request along with the new certificate set that is to be stored in the lower level apparatus 40.

The upper level apparatus 30, upon receiving the certificate set request, transmits a certificate update request and the new certificate set to a designated IP address (in this example, rescue URL) (S316). Before transmitting the new certificate set to the lower level apparatus 40, the upper level apparatus 30 may obtain a MAC address from the transmission destination for comparing the obtained MAC address with the MAC address indicated in the certificate set request.

Meanwhile, in the lower level apparatus 40, the HTTPS server function part 42 sends the received certificate update request to the request management part 44. Then, the request management part 44 orders the certificate update part 48 to execute a certificate update process, to thereby update the regular authentication information stored in the certificate memory part 45 with the contents of the received new certificate set (S317). Then, the lower level apparatus 40 returns a certificate update request response indicative of the update results to the upper level apparatus 30 (S318). Based on the certificate update request response, the upper level apparatus 30 returns a certificate set request response in response to the certificate set request from the certificate management apparatus 20 (S319). Then, the process is temporarily finished.

It is preferable to disconnect the communications between the upper level apparatus 30 and the lower level apparatus 40 temporarily, and re-establish connection in Step S316, by transmitting a communication request again to the rescue URL of the lower level apparatus 40.

After the update of the certificates are completed, the lower level apparatus 40 has the HTTPS client function part to function as an upper level apparatus client, and transmits a communication request to the regular URL of the upper level apparatus 30 (although not described in the flowcharts of FIGS. 13 and 14). Then, the lower level apparatus 40 transmits a certificate update result notification indicative of the update process results along with version information of the updated certificate set, an apparatus no., and an IP address (S321). The upper level apparatus 30 returns a certificate update result notification response in response to the notification from the lower level apparatus 40 (S322). In this communication, the authentication process is executed with a regular public key certificate, in which the authentication process will succeed by using the certificate included in the new certificate set.

The upper level apparatus 30, upon receiving the notification in Step S321, transmits a communication request (lower level apparatus re-search request) to the regular URL of the lower level apparatus 40 for re-searching the lower level apparatus 40 (S331). The re-searching is performed in order to confirm that authentication using the regular public key certificate can be successfully executed and that suitable communication can be achieved in a case where communication is requested from the side of the upper level apparatus 30. The lower level apparatus 40 returns a lower level apparatus re-search response in response to the request from the upper level apparatus 30 (S332).

The upper level apparatus 30, upon receiving the re-search response, determines that the certificate update is a success, and that the regular public key certificate with an unexpired validity term is successfully stored in the lower level apparatus 40, to thereby transmit the certificate update result notification and additional information to the certificate management apparatus 20 and report the success of the update process (S333). Then, in response to the certificate update result notification, the certificate management apparatus 20 returns a certificate update result notification response to the upper level apparatus 30.

According to the communication system shown in FIGS. 1 and 2, by performing the above-described processes, the certificate of the lower level apparatus 40 can be updated and the authentication process can be achieved even in a case where the validity term of the public key certificate in the regular authentication information of the lower level apparatus 40 is expired.

In performing the above-described processes with the upper level apparatus 30 and the lower level apparatus 40 in a regular case of requesting communication, the authentication process is executed by using the regular public key certificate and identifying the communication opponent, to thereby obtain a secure communication path according to SSL protocol. Meanwhile, in a case where authentication using the regular public key certificate fails, the authentication process is executed by using the rescue public key certificate having a longer validity term than that of the regular public key certificate, and updating the regular authentication information (when the authentication using the rescue public key certificate succeeds) by transmitting a new certificate set from the upper level apparatus 30 to the lower level apparatus 40, to thereby safely, automatically, and easily set an unexpired validity term for the regular public key certificate for enabling authentication.

Although the rescue public key certificate may be inferior to the regular public key certificate from the aspect of security, the rescue public key certificate can still provide a considerable degree of security. Furthermore, by preparing the rescue public key certificate along with the regular public key certificate, a secure communication path using a common key code can be maintained even when the validity term of the regular public key certificate is expired as long as the validity term of the rescue public key certificate is not expired.

Furthermore, with the authentication process using the rescue public key certificate, the new certificate set can be prevented from being stored in an inappropriate apparatus since the destination of the new certificate set can be verified before transmission. In a case of two-way authentication, the lower level apparatus 40 can be prevented from storing an inappropriate (fraudulent) certificate as the regular authentication information since the lower level apparatus 40 can verify the authenticity of the transmission origin of the new certificate set. Furthermore, even in a case where authentication using the regular public key certificate cannot be executed, the new certificate set can be transmitted through a secure communication path according to SSL protocol by the authentication using the rescue public key certificate, thereby security can be maintained without the content of the new certificate set leaking to a third person.

Since the lower level apparatus 40 can only accept a certificate update request from a communication opponent authenticated with the rescue public key certificate, information other than the certificate update information can only be accessed by an appropriate communication opponent authenticated with the regular public key certificate. Therefore, even in an unlikely case where a third person fraudulently obtains the rescue private key within the validity term of the rescue public key certificate, important information of the lower level apparatus 30 can be prevented from being accessed by the third person.

Since the public key certificate can be automatically updated according to the above-described embodiment of the present invention, it is particularly effective when the communication apparatus of the communication opponent is an apparatus that cannot be updated by the operator at the place where the apparatus is installed (e.g. set top box for cable T.V., or an image forming apparatus subjected to remote maintenance).

Another (Variation) of an Embodiment according to the Present Invention

In the above-described embodiment of the present invention, the regular authentication information of the lower level apparatus 40 is updated when the authentication process is successfully executed in a case where the authentication process using the regular public key certificate cannot be executed due to expiration of the validity term of the regular public key certificate. In the above-described embodiment of the present invention, the above-described system may have plural lower level apparatuses 40 connected/disconnected to a single upper level apparatus 30. Therefore, managing the lower level apparatus(es) 40 may be more difficult compared to managing a single upper level apparatus 30, and expiration of the validity term of the regular public key certificate is more likely to occur in the lower level apparatus(es) 40 rather than the upper level apparatus 30. Accordingly, in the above-described embodiment of the present invention, the regular authentication information for the lower level apparatus 40 is updated rather than that of the upper level apparatus 30.

Figure 17:
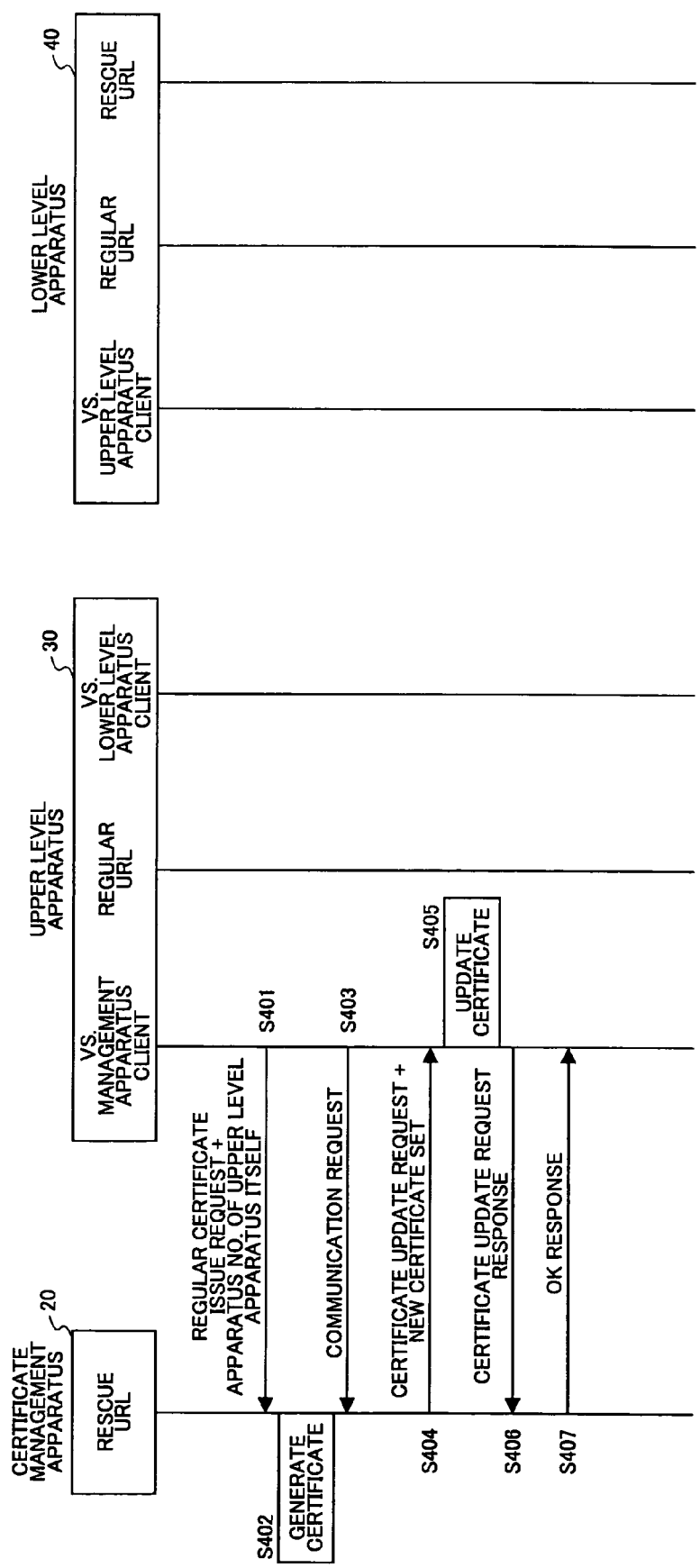
FIG. 17 is a diagram showing an exemplary sequence operation in a case of an upper level apparatus updating its own regular authentication information in a communication system according to an embodiment of the present invention.

However, expiration of the validity term of the regular public key certificate may occur for the upper level apparatus 30. In a case where the upper level apparatus 30 realizes the expiration, the upper level apparatus 30 may execute update of the regular authentication information corresponding to the upper level apparatus 30 itself. This case is described below as a sequence operation with reference to FIG. 17.

In this case, the upper level apparatus 30 has the HTTPS client function part 31 function as the CA client (management apparatus client), and requests generation of a new certificate set for the upper level apparatus 30 itself by transmitting a regular certificate issue request and an apparatus number of the upper level apparatus itself to the certificate management apparatus 20 (S401). Here, the regular public key certificate of the upper level apparatus 30 cannot be used for two-way authentication since the validity term the regular public key certificate of the upper level apparatus 30 is expired. Accordingly, the upper level apparatus 30 accesses the rescue URL of the certificate management apparatus 20 in order to use the rescue public key certificate for authentication. In a case where the upper level apparatus 30 only verifies authenticity of the certificate management apparatus 20, authentication using the regular public key certificate may be executed.

The certificate management apparatus 20, upon receiving the request of Step S401, generates a certificate set and a certificate set request (S402). The public key certificate included in the certificate set has a validity term that is unexpired.

Subsequent to transmitting the request in Step S401, the upper level apparatus 30 transmits a communication request to the certificate management apparatus 20 substantially at a timing where the generation of the certificate set is completed, and queries whether there are any requests from the certificate management apparatus 20 (S403). If the process of Step S402 is completed, the certificate management apparatus 20, in response to the communication request from the upper level apparatus 30, transmits the certificate set request and the new certificate set to the upper level apparatus 30 (S404).

The upper level apparatus 30, upon receiving the request, updates the regular authentication information stored in the certificate memory part 45 with the contents of the received new certificate set (S405), and returns a certificate update request response indicative of the results of the update process to the certificate management apparatus 20 (S406). The certificate management apparatus 20 returns a response (notification) reporting reception of the certificate update request response to the upper level apparatus 40 (S407).

Accordingly, similar to the lower level apparatus 40, the regular authentication information of the upper level apparatus 30 can be updated by performing the above-described processes.

In addition, although the above described embodiment according to the present invention is described as a case where the authentication with the regular public key certificate is executed when the upper level apparatus 30 requests communication with the lower level apparatus 40, the upper level apparatus 30 may periodically request communication with respective lower level apparatuses 40 and conduct a search with respect to the lower level apparatus(es) 40. With this procedure, lower level apparatus(es) 40 having a regular public key certificate with an expired validity term can be checked periodically, and update can be executed whenever a lower level apparatus 40 having a regular public key certificate with an expired validity term is found. Accordingly, each apparatus in this communication system can continue to verify authenticity of a communication opponent.

Furthermore, the search may be conducted not only for the IP address of the communication opponent stored in the memory of the upper level apparatus 30, but may be conducted for all IP addresses covering a predetermined area. Therefore, even when a new lower level apparatus 40 is connected to the communication system, the upper level apparatus 30 is able to automatically detect the new lower level apparatus 40 and enable authentication using the regular public key certificate. Accordingly, even if the validity term of the regular public key certificate originally stored in the lower level apparatus 40 during manufacture becomes expired before being connected to the communication system, a new regular public key certificate for the lower level apparatus 40 can be generated by the certificate management apparatus 20 and stored in the lower level apparatus 40 when the authentication using the rescue public key certificate is a success.

Since the update of the regular public key certificate is executed as soon as the expiration of the validity term is detected by the search, the search may be regarded as part of an update operation of the lower level apparatus 40.

Although the above-described embodiment according to the present invention is described as a case where the upper level apparatus 30 requests communication to the upper level apparatus 40, the lower level apparatus 40 may also alternatively request communication with the upper level apparatus 30.

Figure 18:
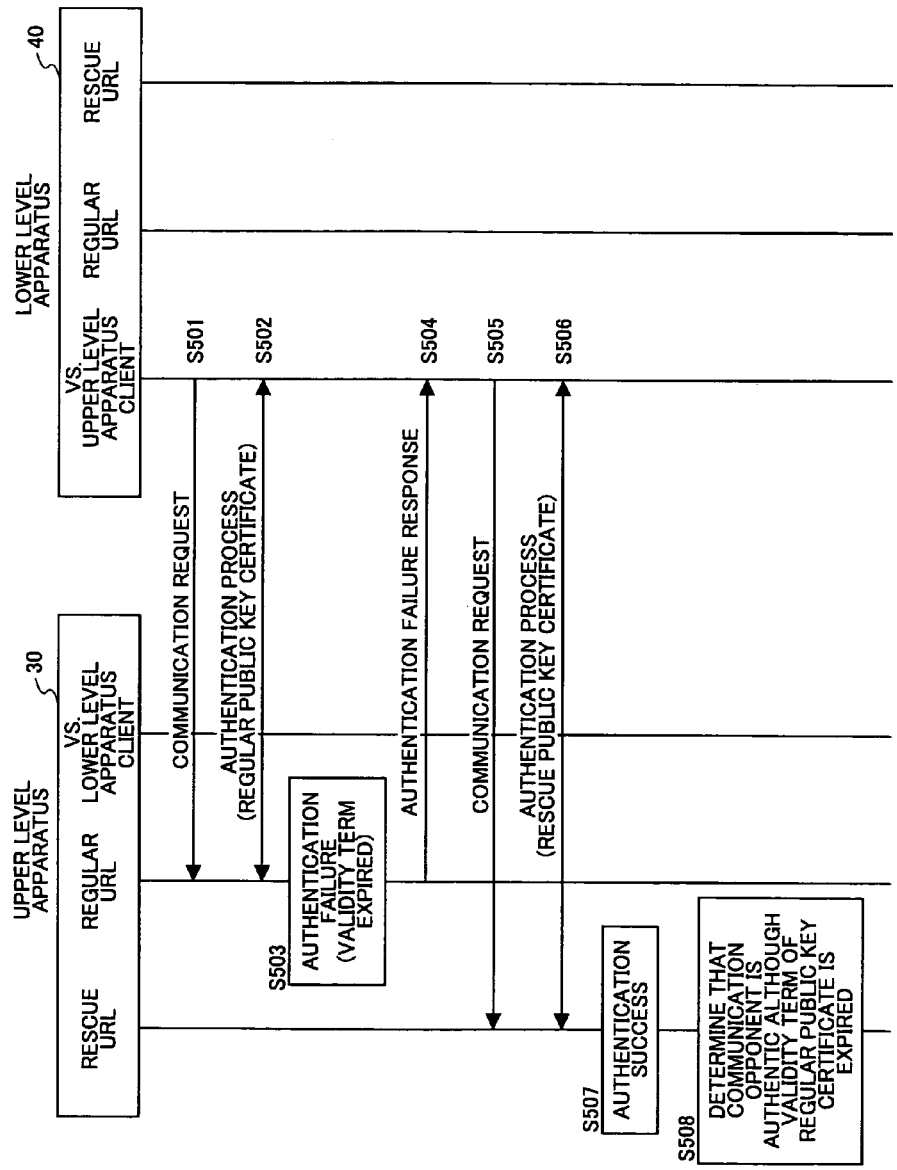
FIG. 18 is a diagram showing a variation of the sequence operation shown in FIG. 15 according to an embodiment of the present invention.
Figure 19:
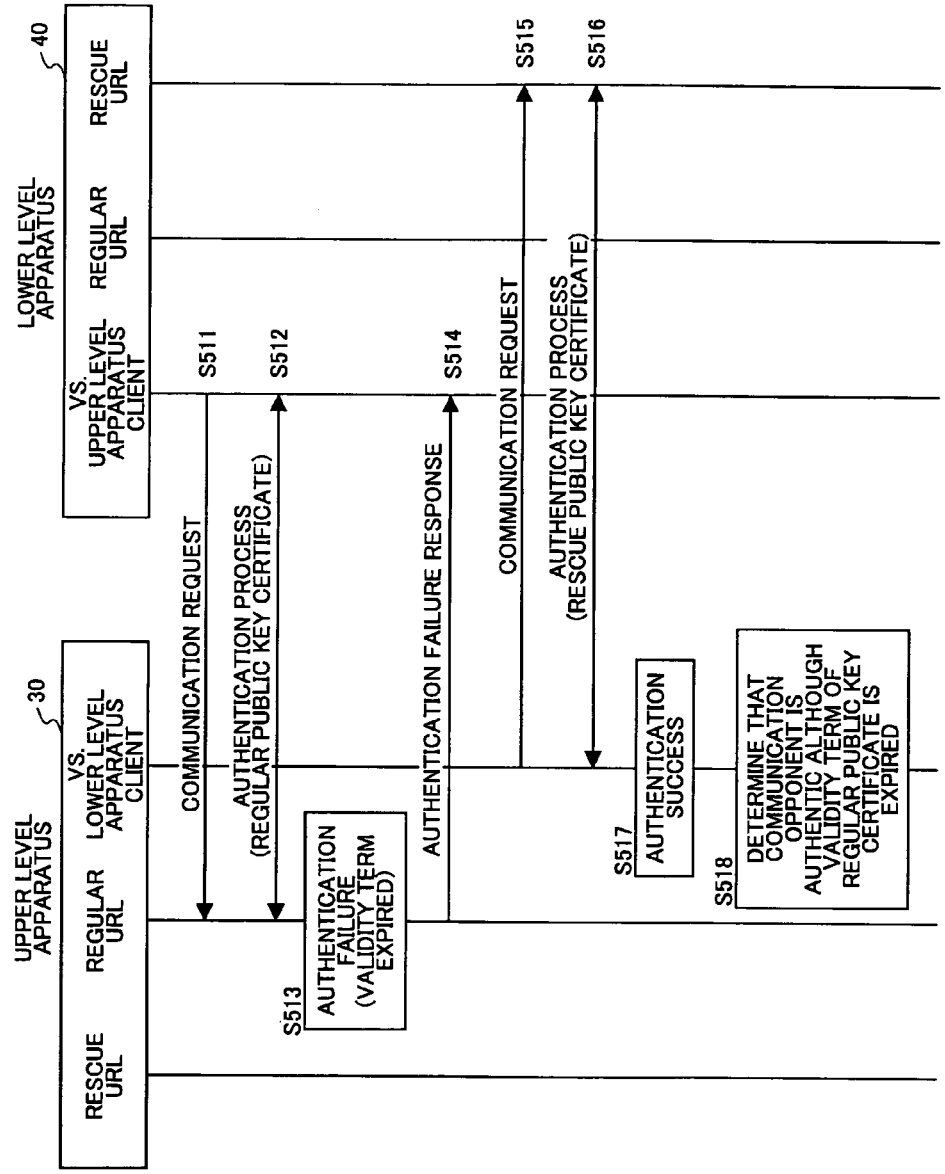
FIG. 19 is a diagram showing another variation of the sequence operation shown in FIG. 15 according to an embodiment of the present invention.
Figure 20:
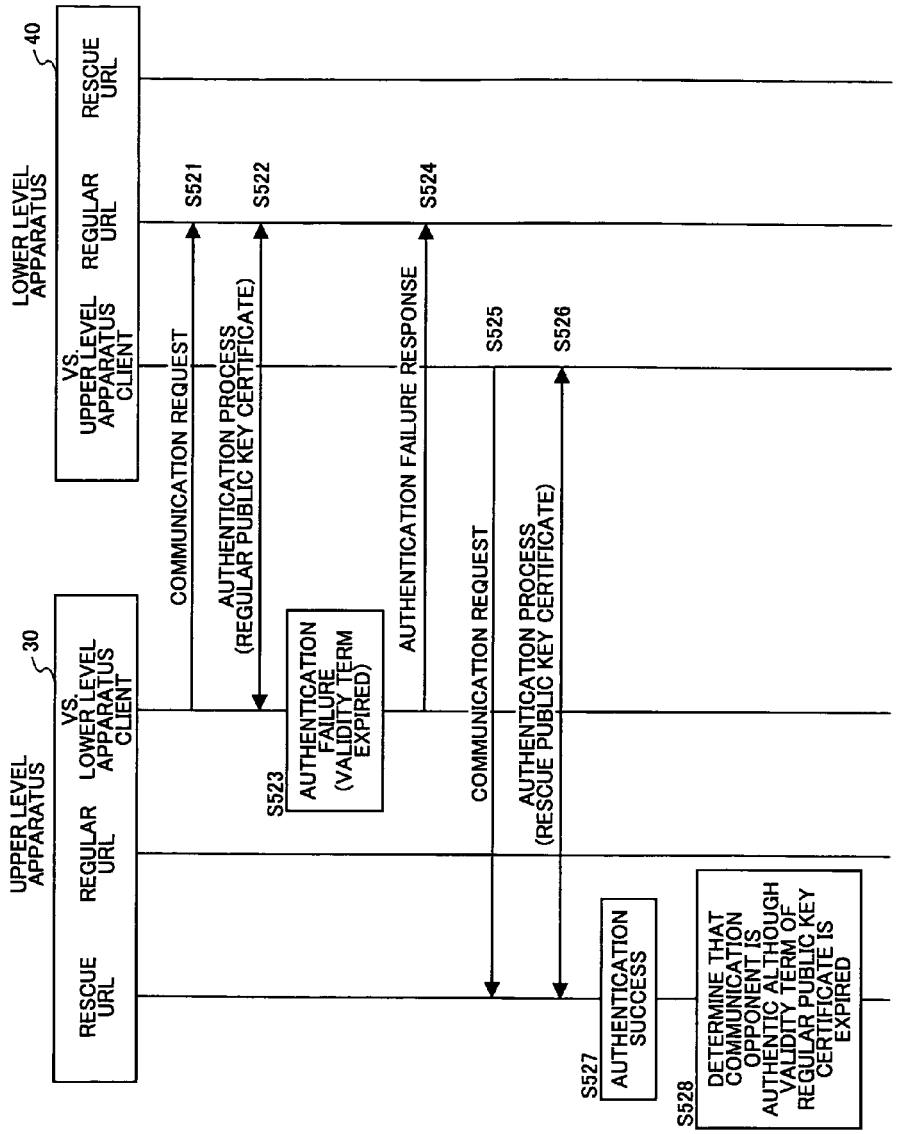
FIG. 20 a diagram showing further another variation of the sequence operation shown in FIG. 15 according to an embodiment of the present invention.

Accordingly, this case is next described as a sequence operation with reference to FIGS. 18 to 20. It is to be noted that this sequence operation is simplified compared to that of FIG. 15.

In the example shown in FIG. 18, the lower level apparatus 40 requests communication with the upper level apparatus 30 in a case of executing authentication with the regular public key certificate and in a case of executing authentication with the rescue public key certificate.

First, the lower level apparatus 40 transmits a communication request to the regular URL of the upper level apparatus 40 for establishing regular communications with the upper level apparatus 30 (S501). Then, authentication using the regular public key certificate is executed between the upper level apparatus 30 and the lower level apparatus 40 (S502).

Although the authentication process may be executed by two-way authentication (as shown in FIG. 22) or one-way authentication, the upper level apparatus 30 is to at least verify authenticity of the lower level apparatus 40 by using the public key certificate of the lower level apparatus 40. In this example, the process may be slightly different from the case shown in FIG. 24 since the lower level apparatus 40 corresponds to the client in a case of one-way authentication. However, it is the same in that the lower level apparatus 40 transmits the public key certificate along with the random number encoded with its own private key to the upper level apparatus 30, and that the upper level apparatus 30 executes authentication by decoding the random number after verifying the authenticity of the received public key certificate.

Then, when the upper level apparatus 30 determines that the authentication process in Step S502 is a failure due to expiration of the validity term of the regular public key certificate (S503), the upper level apparatus 30 transmits an authentication failure response to the lower level apparatus 40 (S504). Then, the lower level apparatus 40, upon receiving the response, transmits a communication request to the rescue URL of the upper level apparatus 30 (S505). Then, the authentication process between the upper level apparatus 30 and the lower level apparatus 40 is executed (S506). When the upper level apparatus 30 determines that the authentication process is a success (S507), the upper level apparatus 30, similar to Step S311 of FIG. 15, determines that the lower level apparatus 40 is an authentic communication opponent although the validity term of the regular public key certificate is expired (S508). Then, the process shown in FIG. 16 is executed for updating the regular authentication information of the lower level apparatus 40.

FIG. 19 shows an example where communication is requested from the lower level apparatus 40 to the upper level apparatus 30 when the authentication process is executed by using the regular public key certificate, and where the communication is requested by the upper level apparatus 30 to the lower level apparatus 40 when the authentication process is executed by using the rescue public key certificate.

In this example, Steps S511 to S514 correspond to Steps S501 to S504 of FIG. 18. In this example, however, the upper level apparatus 30 transmits a request to the rescue URL of the lower level apparatus 40 after returning an authentication failure response to the lower level apparatus 40 (S515). Then, the authentication process using the rescue public key certificate is executed between the upper level apparatus 30 and the lower level apparatus 40 (S516). When the upper level apparatus 30 determines that the authentication process is a success (S517), the upper level apparatus 30, similar to Step S311 of FIG. 15, determines that the lower level apparatus 40 is an authentic communication opponent although the validity term of the regular public key certificate is expired (S518). Then, the process shown in FIG. 13 is executed for updating the regular authentication information of the lower level apparatus 40.

FIG. 20 shows an example where communication is requested by the upper level apparatus 30 for the lower level apparatus 40 when the authentication process is executed by using the regular public key certificate, and where the communication is requested by the lower level apparatus 40 for the upper level apparatus 30 when the authentication process is executed by using the rescue public key certificate.

The upper level apparatus 30 transmits a communication request to the regular URL of the lower level apparatus 40 for establishing regular communications with the lower level apparatus 40 (S521). Then, authentication using the regular public key certificate is executed between the upper level apparatus 30 and the lower level apparatus 40 (S522). The authentication process may be executed by two-way authentication (as shown in FIG. 22) or one-way authentication (as shown in FIG. 24).

Then, when the upper level apparatus 30 determines that the authentication process in Step S522 is a failure due to expiration of the validity term of the regular public key certificate (S523), the upper level apparatus 30 transmits an authentication failure response to the lower level apparatus 40 (S524). Then, the lower level apparatus 40, upon receiving the response, transmits a communication request to the rescue URL of the upper level apparatus 30 (S525). Then, the authentication process between the upper level apparatus 30 and the lower level apparatus 40 is executed (S526). When the upper level apparatus 30 determines that the authentication process is a success (S527), the upper level apparatus 30, similar to Step S311 of FIG. 15, determines that the lower level apparatus 40 is an authentic communication opponent although the validity term of the regular public key certificate is expired (S528). Then, the process shown in FIG. 16 is executed for updating the regular authentication information of the lower level apparatus 40.

Accordingly, the same advantages can also be attained with the sequence operations according to the embodiments of the present invention shown in FIGS. 18 through 20, in which the lower level apparatus 40 can be determined as an authentic communication opponent even where the validity term of the regular public key certificate is expired on condition that the authentication using the rescue public key certificate is a success. Here also, the upper level apparatus 30 obtains a new certificate set and transmits the new certificate set to the lower level apparatus 30 for enabling the lower level apparatus 40 to update its regular authentication information. Thereby, the regular public key certificate can be safely, automatically, and easily set for achieving efficient authentication.

The apparatus for transmitting the communication request may be altered according to circumstance. For example, the upper level apparatus 30 may transmit a communication request to the rescue URL of the lower level apparatus 40 when authentication using the regular public key certificate fails, or the lower level apparatus 40 may transmit a communication request to the rescue URL of upper level apparatus 30 when receiving an authentication failure response from the upper level apparatus 30. Therefore, the processes thereafter can be executed regardless of which apparatus initially transmits a communication request to the regular URL of the communication opponent.

In the transmission of the new certificate set (e.g. Step S316 of FIG. 16), the lower level apparatus 40 may transmit a communication request to the upper level apparatus 30, and the upper level apparatus 40 may then transmit a certificate update request in response to the communication request from the lower level apparatus 40.

In the above-described embodiments of the present invention, the regular public key certificate and the rescue public key certificate are both issued by a CA of the same vendor. However, it is preferable to request a highly trusted third-party CA to issue the regular public key certificate. Although the regular public key certificates issued by such third party CA often has a short validity term, the short validity term would be no problem since the regular public key certificate can be updated safely, automatically, and easily even if the validity term of the regular public key certificate has expired. By employing the authentication using the public key certificate issued by a highly trusted CA of a third-party organization, the communication system according to an embodiment of the present invention can be efficiently operated.

In this case, the issuing of the regular public key certificates may be requested directly from the upper level apparatus 30 to the CA of the third-party organization, or may be requested from the upper level apparatus 30 to the CA of the third-party organization via the certificate management apparatus 20.

Meanwhile, the vendor of the upper level apparatus 30 and/or the lower level apparatus 40 may establish a CA by itself so as to freely set the validity term of its rescue public key certificates. However, since the validity term of the rescue public key certificate is set as a relatively long term, it is preferable to keep the rescue public key certificate under strict secrecy so as to prevent the rescue root private key from being obtained by an unauthorized person, and maintain secure communication. One example for ensuring secure communication is to employ a certificate management apparatus that cannot be accessed from the outside (e.g. a certificate management apparatus that can communicate with an installation for storing the rescue public key certificate only through a dedicated communication line).

The certificate management apparatus 20 may be separately provided in accordance with the target apparatus to which the certificate is issued (e.g. a certificate management apparatus for issuing a certificate for an upper level apparatus, a certificate management apparatus for issuing a certificate for a lower level apparatus, or a certificate management apparatus for issuing a certificate for another certificate management apparatus).

The regular public key certificate and the rescue public key certificate may be issued by separate CAs, or may alternatively be issued by the same CA.

The above-described certificates according to the embodiments of the present invention are described including a regular public key certificate having a short validity term and a rescue public key certificate having a long validity term. However, the former may correspond to a certificate having a high security level and the latter may correspond to a certificate having relatively low security level.

In general, a certificate having a high security level is subject to various restrictions (e.g. requirement of a large amount of information to be written thereto, export restrictions, requirement for a special authentication program). Therefore, it is difficult to store such a certificate in every apparatus for executing authentication. On the other hand, a certificate having a low security level is not subject to such restrictions. Therefore, it is relatively easy to store the certificate in all apparatuses for executing authentication.

In addition, there are demands for storing the certificate having the high security level in the apparatus having the low security level certificate according to its environment after the apparatus has been manufactured and/or purchased. Although various methods (techniques) are employed in improving security (e.g. arranging the authentication process, selecting a highly trusted CA), there may be a case where a certificate for a regular authentication process is required to be altered for improving security (e.g. moving (installed) an apparatus from one system to another, which includes changing the settings of the apparatus). Furthermore, there may be a case where the authentication method is to be changed due to a defect found afterwards in the certificate with a high security level.

The above-described embodiments of the present invention can also be applied to such cases. For example, in a case where authentication using the certificate with the high security level fails, the certificate with the low security level can be used for authentication. If the authentication using the certificate with the low security level is a success, the upper level apparatus 30 determines that an abnormality in authentication is the cause of the failure in the authentication using the certificate with the high security level. Then, the upper level apparatus 30 obtains a certificate set including a certificate with a high security level and transmits the certificate set to the lower level apparatus 40. Then, the lower level apparatus 40 stores the received certificate set. Accordingly, in a case, for example, where an apparatus is moved, a certificate matching the new environment can be stored in the apparatus while maintaining a substantial degree of security.

Although the authentication processes (as shown in FIG. 22 or 24) using the upper level apparatus 30, the lower level apparatus 40, and/or the certificate management apparatus 20 is described above in accordance with SSL (SSL protocol), other protocols, methods and techniques may alternatively be employed.

For example, TLS protocol may alternatively be employed for the authentication process according to an embodiment of the present invention.

Although the certificate management apparatus 20 and the upper level apparatus 30 are described as separate apparatuses according to the above-described embodiments of the present invention, the certificate management apparatus 20 and the upper level apparatus 30 may be provided as a united body. In this case, components such as the CPU, the ROM and/or the RAM may be provided separately for executing the functions of the certificate management apparatus 20 and the functions of the upper level apparatus 30, or the CPU, the ROM and/or the RAM of the upper level apparatus 30 may be used along with software for executing the functions of the certificate management apparatus 20.

In this case, the communication between the certificate management apparatus 20 and the upper level apparatus 20 forming a united body includes process-to-process communication for achieving communications between a process of enabling hardware to function as the certificate management apparatus 20 and a process of enabling the hardware to function as the upper level apparatus 30.

Although the certificate management apparatus 20 according to the above-described embodiments of the present invention is described as generating a root key and a digital certificate by itself, the functions of the authentication key generation part 24 and the certificate issuance part 25 may be executed by a separate apparatus(es), in which the certificate management apparatus 20 obtains the root key and the digital certificate from the separate apparatus(es).

Although the authentication process in the above-described embodiments of the present invention is employed in a case where the authentication process using the regular public key certificate fails due to expiration of the validity term of the regular public key certificate, the authentication process may be employed in a case where the authentication process fails due to other reason(s). For example, the processes after Step S104 shown in FIG. 13 may be executed even when the failure of the authentication process is due to other reason(s).

In this case also, the upper level apparatus 30 can determine that the opponent having requested communications is an authentic communication opponent when the authentication process using the rescue public key certificate succeeds. Furthermore, it can be determined that the failure of the authentication process using the regular public key certificate is due to a defect in the regular public key certificate stored in the lower level apparatus 40. Accordingly, such defect can be promptly eliminated and authentication using the regular public key certificate can be allowed again by transmitting new authentication information to the lower level apparatus 40 and updating authentication information stored in the lower level apparatus 40 with the new authentication information.

However, when the failure of the authentication process is due to, for example, an opponent apparatus being inappropriate as a communication opponent according to the identification information in the public key certificate, for example, giving no response to a communication request, or a response reporting non-conformity with the authentication process, the communication opponent may be an apparatus having no relation with the upper level apparatus 30. Therefore, in this case, access to the rescue URL may be denied.

Furthermore, if the certificate management apparatus 20 has a previously issued public key or private key for the lower level apparatus 30, the certificate management apparatus 20 may use the public key or private key in a case where the validity term of the regular public key certificate is not yet expired.

Figure 21:
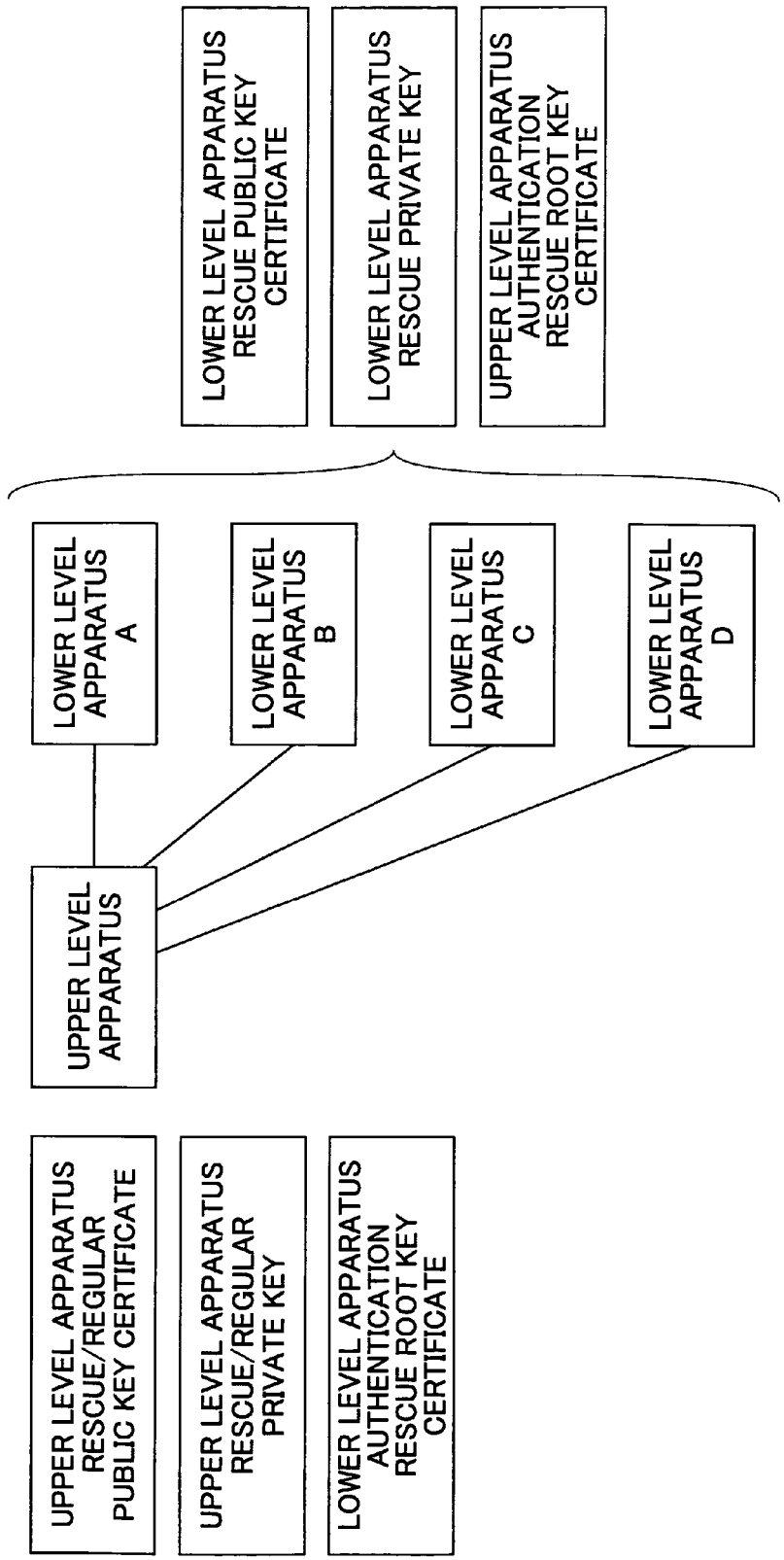
FIG. 21 is a diagram showing plural lower level apparatuses provided in a communication system according to an embodiment of the present invention.

Although the rescue public key certificate according to the above-described embodiment of the present invention includes identification information corresponding to respective apparatuses, such identification information may be omitted therefrom. Alternatively, apparatuses of a same level (in the example shown in FIGS. 1 and 2, there are levels for the certificate management apparatus, the upper level apparatus, and the lower level apparatus) may be stored with the same rescue public key certificate. In this case, the rescue public key and the corresponding private key included in the rescue public key certificate may be the same since the apparatuses of the same level are not required to be distinguishable. Furthermore, the root key certificate is the same for all apparatuses of a prescribed level since the rescue public key certificate of the communication opponent is the same. That is, in a case where plural lower level apparatuses are provided (See FIG. 21), the same rescue authentication information is stored in all of the lower level apparatuses.

This applies to the rescue authentication information of the upper level apparatus 30 and the rescue authentication information of the certificate management apparatus 20.

For example, in a case of coordinating the data format with respect to the regular public key certificate, the item "Subject" in FIG. 8 may be left as a blank, or the apparatus no. may be indicated as 0 to leave only the name of the vendor remaining as an indication of a rescue public key certificate.

Accordingly, since the rescue authentication information is the same for all apparatuses of the same level, the same rescue authentication information is stored in respective apparatuses during manufacture according to the level of the apparatus(es). Since the rescue authentication information does not include identification information for the respective apparatuses, no certificate is required to be distributed to respective apparatuses marked with identification numbers after an inspection process. Thereby, rescue authentication information can be stored in many apparatuses with a simple process. For example, rescue authentication information can be included in the master control program, and the rescue authentication information can be stored when the control program is copied to the apparatuses.

By setting the validity term of the rescue public key certificate with a considerably long period, the necessity of updating the rescue public key certificate can be eliminated or reduced, thereby maintaining a state where authentication using the rescue public key certificate is possible in a case where the validity term of the regular public key certificate is expired.

In this case, the apparatus of the communication opponent cannot be specifically identified since identification information of the apparatus is not included in the rescue public key certificate. However, some information regarding the communication opponent can still be obtained.

For example, in a case where a vendor stores rescue authentication information dedicated to its lower level apparatuses (lower level apparatus rescue public key certificate, lower level apparatus private key, and upper level apparatus authentication root key certificate) in all of its lower level apparatuses 40, and stores rescue authentication information dedicated to its upper level apparatuses (upper level apparatus rescue public key certificate, upper level apparatus private key, and lower level apparatus authentication root key certificate) in all of its upper level apparatuses 30, the lower level apparatus 40 can determine that the communication opponent is an upper level apparatus 30 originating from the same vendor when the authentication process succeeds according to the upper level apparatus rescue root key certificate stored therein. On the other hand, the upper level apparatus 30 can determine that the communication opponent is an upper level apparatus 30 originating from the same vendor when the authentication process succeeds according to the lower level apparatus rescue root key certificate stored therein.

After the success of the authentication process, a common key can be shared between the upper level apparatus 30 and the lower level apparatus 40, to thereby obtain a secure communication path by encoding with the common key. Subsequently, the communication opponent can be identified by exchanging information such as apparatus number. This applies to the relation between the certificate management apparatus 20 and the upper level apparatus 30.

It is to be noted that apparatus identification information may also be omitted from the regular public key certificate. This allows security to be enhanced since the regular public key certificate has a validity term shorter than that of the rescue public key certificate.

The program according to an embodiment of the present invention is a program enabling a computer to function as a communication apparatus (e.g. upper level apparatus 30, lower level apparatus 40) and/or as a communication opponent of the communication apparatus, having a communication part for authenticating a communication opponent by using a digital certificate during communication. By executing the program, the above-described advantages and functions can be attained.

The program may be stored in a memory part (e.g. ROM, HDD) of a computer beforehand, and/or stored in a recording medium such as a CD-ROM or a flexible disk, or a non-volatile recording medium (memory) such as SRAM, EEPROM, or a memory card. In executing the above-described processes, the program, for example, stored in the memory may be installed in a computer for execution by a CPU, or the CPU may read out the program from the memory and execute the program.

Furthermore, the above-described processes may be executed by connecting a network to an external apparatus having a recording medium with the program recorded thereto, or by downloading the program from an external apparatus having a memory unit with the program stored therein.

Further, the present invention is not limited to these embodiments, but various variations and modifications may be made without departing from the scope of the present invention.

The present application is based on Japanese priority application Nos. 2003-201638, 2003-201644, 2003-341329 and 2004-217713 filed on Jul. 25, 2003, Jul. 25, 2003, Sep. 30, 2003, and Jul. 26, 2004, respectively, with the Japanese Patent Office, the entire contents of which are hereby incorporated by reference.

What is claimed is:

1. A communication apparatus comprising:
first and second digital certificates, the second digital certificate corresponding to a regular public key, the first digital certificate corresponding to a rescue public key, the first digital certificate having a validity term that is longer than the validity term of the second digital certificate;
an authentication part configured to authenticate another communication apparatus with the first digital certificate when communicating with the another communication apparatus and when the validity term of the second digital certificate is expired;
a certificate transmission part configured to transmit a new second digital certificate when the authentication part succeeds in authenticating the other communication apparatus with the first digital certificate; and
a request management unit that stores a criterion to determine execution of an operation according to a request from the another communication apparatus, and allows operations of the communication apparatus to be executed such that all of the operations are allowed to be executed when the another communication apparatus is authenticated by the second digital certificate according to the stored criterion, and only an operation of transmitting the new second digital certificate is allowed when the another communication apparatus is authenticated by the first digital certificate.

2. The communication apparatus as claimed in claim 1, wherein the first digital certificate has a validity term which is longer than a life-span of the other communication apparatus, and the second digital certificate has a validity term which is shorter than the life-span of the other communication apparatus.

3. The communication apparatus as claimed in claim 1, wherein the first digital certificate has a validity term which does not expire when the other communication apparatus is in operation, and the second digital certificate has a validity term which expires when the other communication apparatus is in operation.

4. The communication apparatus as claimed in claim 1, wherein the first digital certificate has substantially no validity term, and the second digital certificate has a validity term.

5. The communication apparatus as claimed in claim 1, wherein the authentication part authenticates the other communication apparatus in accordance with at least one of SSL protocol and TLS protocol.

6. The communication apparatus as claimed in claim 1, wherein the second digital certificate is a public key certificate of the other communication apparatus.

7. A communication apparatus comprising:
a certificate memory part configured to store a first digital certificate and a second digital certificate, the second digital certificate corresponding to a regular public key, the first digital certificate corresponding to a rescue public key, the first digital certificate having a validity term that is longer than the validity term of the second digital certificate;
a certificate update part configured to update an old second digital certificate stored in the certificate memory part when receiving a new second digital certificate from another communication apparatus when communicating with the another communication apparatus and when the validity term of the old second digital certificate is expired; and
a request management unit that stores a criterion to determine execution of an operation according to a request from the another communication apparatus, and allows operations of the communication apparatus to be executed such that all of the operations are allowed to be executed when the another communication apparatus is authenticated by the second digital certificate according to the stored criterion, and only an operation of transmitting the new second digital certificate is allowed when the another communication apparatus is authenticated by the first digital certificate.

8. A communication system comprising:
a first communication apparatus, the first communication apparatus including a certificate memory part configured to store a first digital certificate and a second digital certificate, the second digital certificate corresponding to a regular public key, the first digital certificate corresponding to a rescue public key, the first digital certificate having a validity term that is longer than the validity term of the second digital certificate;

a second communication apparatus, the second communication apparatus including an authentication part configured to authenticate the first communication apparatus with the first digital certificate when communicating with the first communication apparatus and when the validity term of the second digital certificate is expired;

the second communication apparatus also includes a certificate transmission part configured to transmit a new second digital certificate to the first communication apparatus when the authentication part succeeds in authenticating the first communication apparatus with the first digital certificate; and the second communication apparatus also includes a request management unit that stores a criterion to determine execution of an operation according to a request from the another communication apparatus, and allows operations of the communication apparatus to be executed such that all of the operations are allowed to be executed when the first communication apparatus is authenticated by the second digital certificate according to the stored criterion, and only an operation of transmitting the new second digital certificate is allowed when the first communication apparatus is authenticated by the first digital certificate.

9. The communication system as claimed in claim 8, wherein the first digital certificate is used for authenticating the first communication apparatus in a case of storing the new second digital certificate in the first communication apparatus.

10. The communication system as claimed in claim 8, wherein the first digital certificate has a validity term which is longer than a life-span of the first communication apparatus, and the second digital certificate has a validity term which is shorter than the life-span of the first communication apparatus.

11. The communication system as claimed in claim 8, wherein the first digital certificate has a validity term which does not expire when the first apparatus is in operation, and the second digital certificate has a validity term which expires when the first communication apparatus is in operation.

12. The communication system as claimed in claim 8, wherein the first digital certificate has substantially no validity term, and the second digital certificate has a validity term.

13. The communication system as claimed in claim 8, further comprising another first communication apparatus, the other first communication apparatus including another certificate memory part for storing at least one of the first digital certificate and the second digital certificate.

14. The communication system as claimed in claim 8, wherein the authentication part authenticates the first communication apparatus in accordance with at least one of SSL protocol and TLS protocol.

15. The communication system as claimed in claim 8, wherein the second digital certificate is a public key certificate of the first communication apparatus.

16. A certificate transmission method of a communication apparatus comprising:
a) authenticating another communication apparatus with a first digital certificate when authentication using a second digital certificate fails due to expiration of the validity term of the second digital certificate, the second digital certificate corresponding to a regular public key, the first digital certificate corresponding to a rescue public key, the first digital certificate having a validity term that is longer than the validity term of the second digital certificate;
b) transmitting a new second digital certificate when the authentication of the other communication apparatus with the first digital certificate in a) succeeds;
wherein the other communication apparatus is authenticated with the first digital certificate in a) when communicating with the another communication apparatus and when the validity term of the old second digital certificate is expired; and
c) storing a criterion to determine execution of an operation according to a request from the another communication apparatus, and allowing operations of the communication apparatus to be executed such that all of the operations are allowed to be executed when the another communication apparatus is authenticated by the second digital certificate according to the stored criterion, and only an operation of transmitting the new second digital certificate is allowed when the another communication apparatus is authenticated by the first digital certificate.

17. The certificate transmission method as claimed in claim 16, wherein the first digital certificate has a validity term which is longer than a life-span of the other communication apparatus, and the second digital certificate has a validity term which is shorter than the life-span of the other communication apparatus.

18. The certificate transmission method as claimed in claim 16, wherein the first digital certificate has a validity term which does not expire when the other communication apparatus is in operation, and the second digital certificate has a validity term which expires when the other communication apparatus is in operation.

19. The certificate transmission method as claimed in claim 16, wherein the first digital certificate has substantially no validity term, and the second digital certificate has a validity term.

20. The certificate transmission method as claimed in claim 16, wherein the other communication apparatus is authenticated in a) in accordance with at least one of SSL protocol and TLS protocol.

21. The certificate transmission method as claimed in claim 16, wherein the second digital certificate is a public key certificate of the other communication apparatus.

22. A certificate transmission method comprising:
a) authenticating a communication apparatus with a first digital certificate when authentication using a second digital certificate fails due to expiration of the validity term of the second digital certificate, the second digital certificate corresponding to a regular public key, the first digital certificate corresponding to a rescue public key, the first digital certificate having a validity term that is longer than the validity term of the second digital certificate;
b) transmitting a new second digital certificate when the authentication of the communication apparatus with the first digital certificate in a) succeeds;
wherein the communication apparatus is authenticated with the first digital certificate in a) when communicating with another communication apparatus and when the validity term of the old second digital certificate is expired; and
c) storing a criterion to determine execution of an operation according to a request from the another communication apparatus, and allowing operations of the communication apparatus to be executed such that all of the operations are allowed to be executed when the another communication apparatus is authenticated by the second digital certificate according to the stored criterion, and only an operation of transmitting the new second digital certificate is allowed when the another communication apparatus is authenticated by the first digital certificate.

23. The certificate transmission method as claimed in claim 22, wherein the first digital certificate has a validity term which is longer than a life-span of the communication apparatus, and the second digital certificate has a validity term which is shorter than the life-span of the communication apparatus.

24. The certificate transmission method as claimed in claim 22, wherein the first digital certificate has a validity term which does not expire when the communication apparatus is in operation, and the second digital certificate has a validity term which expires when the communication apparatus is in operation.

25. The certificate transmission method as claimed in claim 22, wherein the first digital certificate has substantially no validity term, and the second digital certificate has a validity term.

26. The certificate transmission method as claimed in claim 22, further comprising storing at least one of the first digital certificate and the second digital certificate in another communication apparatus.

27. The certificate transmission method as claimed in claim 22, wherein the communication apparatus is authenticated in a) in accordance with at least one of SSL protocol and TLS protocol.

28. The certificate transmission method as claimed in claim 22, wherein the second digital certificate is a public key certificate of the communication apparatus.

29. A computer readable medium storing computer executable instructions to be executed by a computer of a communication apparatus, the computer executable instructions comprising:
  a) an authenticating function for authenticating another communication apparatus with a first digital certificate when authentication using a second digital certificate fails due to expiration of the validity term of the second digital certificate, the second digital certificate corresponding to a regular public key, the first digital certificate corresponding to a rescue public key, the first digital certificate having a validity term that is longer than the validity term of the second digital certificate;
  b) a transmitting function for transmitting a new second digital certificate when the authentication of the other communication apparatus with the first digital certificate in function a) succeeds;
  wherein the communication apparatus is authenticated with the first digital certificate in function a) when communicating with the another communication apparatus and when the validity term of the old second digital certificate is expired; and
  c) a request management function that stores a criterion to determine execution of an operation according to a request from the another communication apparatus, and allows operations of the communication apparatus to be executed such that all of the operations are allowed to be executed when the another communication apparatus is authenticated by the second digital certificate according to the stored criterion, and only an operation of transmitting the new second digital certificate is allowed when the another communication apparatus is authenticated by the first digital certificate.

30. The computer readable medium as claimed in claim 29, wherein the first digital certificate has a validity term which is longer than a life-span of the other communication apparatus, and the second digital certificate has a validity term which is shorter than the life-span of the other communication apparatus.

31. The computer readable medium as claimed in claim 29, wherein the first digital certificate has a validity term which does not expire when the other communication apparatus is in operation, and the second digital certificate has a validity term which expires when the other communication apparatus is in operation.

32. The computer readable medium as claimed in claim 29, wherein the first digital certificate has substantially no validity term, and the second digital certificate has a validity term.

33. The computer readable medium as claimed in claim 29, wherein the other communication apparatus is authenticated in function a) in accordance with at least one of SSL protocol and TLS protocol.

34. The computer readable medium as claimed in claim 29, wherein the second digital certificate is a public key certificate of the other communication apparatus.

35. A computer readable medium storing computer executable instructions to be installed or executed by a computer of a communication apparatus, the computer executable instructions comprising:
  a) a storing function for storing a first digital certificate and a second digital certificate, the second digital certificate corresponding to a regular public key, the first digital certificate corresponding to a rescue public key, the first digital certificate having a validity term that is longer than the validity term of the second digital certificate;
  b) an updating function for updating an old second digital certificate stored in function a) with a new second digital certificate received from another communication apparatus when communicating with the another communication apparatus and when the validity term of the old second digital certificate is expired; and
  c) a request management function that stores a criterion to determine execution of an operation according to a request from the another communication apparatus, and allows operations of the communication apparatus to be executed such that all of the operations are allowed to be executed when the another communication apparatus is authenticated by the second digital certificate according to the stored criterion, and only an operation of transmitting the new second digital certificate is allowed when the another communication apparatus is authenticated by the first digital certificate.

36. The communication apparatus as claimed in claim 1, further comprising:
  a storage part configured to store a regular URL and a rescue URL as a destination of a communication request to the other communication apparatus; and
  a communication part configured to transmit the communication request to the regular URL when authenticating with the second digital certificate and to transmit the communication request to the rescue URL when authenticating with the first digital certificate.

* * * * *